United States Patent
Ueda et al.

(10) Patent No.: US 11,679,677 B2
(45) Date of Patent: Jun. 20, 2023

(54) DEVICE CONTROL SYSTEM, MOVING VEHICLE, DEVICE CONTROL METHOD, AND NON-TRANSITORY STORAGE MEDIUM

(71) Applicant: Panasonic Intellectual Property Management Co., Ltd., Osaka (JP)

(72) Inventors: Kouji Ueda, Kanagawa (JP); Shigeo Nakamura, Kanagawa (JP); Kenji Matsui, Osaka (JP); Takehiko Yasuda, Kanagawa (JP); Yoshiteru Matsushita, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 17/212,284

(22) Filed: Mar. 25, 2021

(65) Prior Publication Data
US 2021/0206269 A1   Jul. 8, 2021

Related U.S. Application Data

(63) Continuation of application No. PCT/JP2019/037078, filed on Sep. 20, 2019.

(30) Foreign Application Priority Data

Sep. 28, 2018   (JP) .............................. JP2018-186032

(51) Int. Cl.
*B60K 35/00*   (2006.01)
*B60K 37/06*   (2006.01)
(Continued)

(52) U.S. Cl.
CPC .............. *B60K 35/00* (2013.01); *B60K 37/06* (2013.01); *B60R 1/00* (2013.01); *G06F 3/013* (2013.01);
(Continued)

(58) Field of Classification Search
CPC ....................................................... G06F 3/013
See application file for complete search history.

(56) References Cited

U.S. PATENT DOCUMENTS

2009/0024318 A1* 1/2009 Sakai ................. G01C 21/3658
701/533
2010/0324779 A1* 12/2010 Takahashi .............. B60K 37/06
700/90
(Continued)

FOREIGN PATENT DOCUMENTS

EP    2 551 845        1/2013
JP    2009-145592      7/2009
(Continued)

OTHER PUBLICATIONS

Official Communication issued in International Bureau of WIPO Patent Application No. PCT/JP2019/037078, dated Dec. 10, 2019, along with an English translation thereof.

*Primary Examiner* — Nan-Ying Yang
(74) *Attorney, Agent, or Firm* — Greenblum & Bernstein, P.L.C.

(57) ABSTRACT

A device control system includes a first input device and a gaze detector. The first input device allows a command to be entered with respect to a target device selected from one or more devices. The gaze detector detects a user's gaze direction. The gaze detector determines, based on the gaze direction detected by the gaze detector, one device, selected from the one or more devices, to be the target device. A gaze detector makes the target device change, based on the gaze direction detected by the gaze detector, the type of processing to be performed in accordance with the command entered through the first input device.

18 Claims, 16 Drawing Sheets

(51) Int. Cl.
 B60R 1/00 (2022.01)
 G06F 3/01 (2006.01)
(52) U.S. Cl.
 CPC .............. *B60K 2370/149* (2019.05); *B60K 2370/1438* (2019.05); *B60K 2370/166* (2019.05); *B60K 2370/779* (2019.05); *B60R 2300/202* (2013.01); *B60R 2300/802* (2013.01); *B60R 2300/8046* (2013.01)

(56) References Cited

U.S. PATENT DOCUMENTS

| | | | |
|---|---|---|---|
| 2013/0018549 A1* | 1/2013 | Kobana | B60K 28/06 |
| | | | 701/41 |
| 2015/0185834 A1 | 7/2015 | Wingrove et al. | |
| 2015/0309566 A1* | 10/2015 | Hampiholi | G06F 3/013 |
| | | | 345/156 |
| 2016/0200172 A1 | 7/2016 | Nakashima et al. | |
| 2017/0011557 A1* | 1/2017 | Lee | G06F 3/04842 |
| 2017/0269704 A1 | 9/2017 | Akita et al. | |
| 2018/0046246 A1 | 2/2018 | Nishihashi et al. | |

FOREIGN PATENT DOCUMENTS

| | | |
|---|---|---|
| JP | 2011-000957 | 1/2011 |
| JP | 2013-143012 | 7/2013 |
| JP | 2015-063291 | 4/2015 |
| JP | 2015-063292 | 4/2015 |
| JP | 2015-063293 | 4/2015 |
| JP | 2015-125783 | 7/2015 |
| JP | 2016-182857 | 10/2016 |
| JP | 2016-218456 | 12/2016 |
| JP | 2017-165215 | 9/2017 |

* cited by examiner ial Application No. PCT/JP2019/037078 filed on Sep. 20, 2019, which is based upon, and claims the benefit of priority to, Japanese Patent Application No. 2018-186032, filed on Sep. 28, 2018. The entire contents of both applications are incorporated herein by reference.

TECHNICAL FIELD

The present disclosure generally relates to a device control system, a moving vehicle, a device control method, and a non-transitory storage medium. More particularly, the present disclosure relates to a device control system including an input device through which a command is entered with respect to a control target device, a moving vehicle including the device control system, a device control method, and a non-transitory storage medium.

BACKGROUND ART

JP 2016-182857 A discloses an operating system including an operating device (input device) and a selection means (determination device). The operating device is manually operated by the user and instructs a command target device (target device) selected from a multiple devices the type of operation (type of processing) to perform. Based on the user's gaze detected by a gaze detection sensor, the selection means selects, as the command target device, a device associated with a gaze region on which the user turns his or her gaze.

However, the operating system of JP 2016-182857 A requires the user to operate the operating device a number of times (by pressing switches with his or her fingers) until the desired operating screen finally appears on the operating device since the command target device has been selected by his or her gaze. Thus, the user may fail to have his or her desired function performed only by operating the operating device. This causes a decline in the controllability of the command target device via the operating device.

The present disclosure provides a device control system with the ability to improve the controllability of the target device via the input device, a moving vehicle including such a device control system, a device control method, and a non-transitory storage medium.

SUMMARY

A device control system according to an aspect of the present disclosure includes an input device, a detection device, a determination device, and a display device. The input device allows a command to be entered with respect to a target device, which is any one of one or more devices. The detection device detects a user's gaze direction or facial orientation. The determination device determines, based on the gaze direction or facial orientation detected by the detection device, one device, selected from the one or more devices, to be the target device. The determination device makes the target device change, based on the gaze direction or facial orientation detected by the detection device, a type of processing to be performed in accordance with the command entered through the input device. The determination device also makes the target device change, according to a state of the target device as displayed on the display device when the one device is selected as the target device, a type of processing to be performed in accordance with the command entered through the input device.

A moving vehicle according to another aspect of the present disclosure includes: the device control system described above; and the moving vehicle body described above.

A device control method according to still another aspect of the present disclosure includes input processing, detection processing, determination processing, and display processing. The input processing includes accepting a command with respect to a target device, which is any one of one or more devices. The detection processing includes detecting a user's gaze direction or facial orientation. The determination processing includes determining, based on the gaze direction or facial orientation detected in the detection processing, one device, selected from the one or more devices, to be the target device. The display processing includes displaying, on a display device, operation guidance information of the target device. The determination processing includes making the target device change, based on the gaze direction or facial orientation detected in the detection processing, a type of processing to be performed in accordance with the command entered in the input processing. The determination processing further includes making the target device change, according to a state of the target device as displayed on the display device when the one device is selected as the target device, a type of processing to be performed in accordance with the command entered through the input device.

A non-transitory storage medium according to yet another aspect of the present disclosure stores a program which is designed to cause at least one processor to perform the device control method described above.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Embodiments of a device control system will now be described. Note that the embodiments to be described below are only exemplary ones of various embodiments of the present disclosure and should not be construed as limiting. Rather, the exemplary embodiments to be described below may be readily modified in various manners depending on a design choice or any other factor without departing from the scope of the present disclosure.

First Embodiment

A device control system 1 according to a first embodiment will now be described with reference to FIGS. 1-4.

Figure 1:
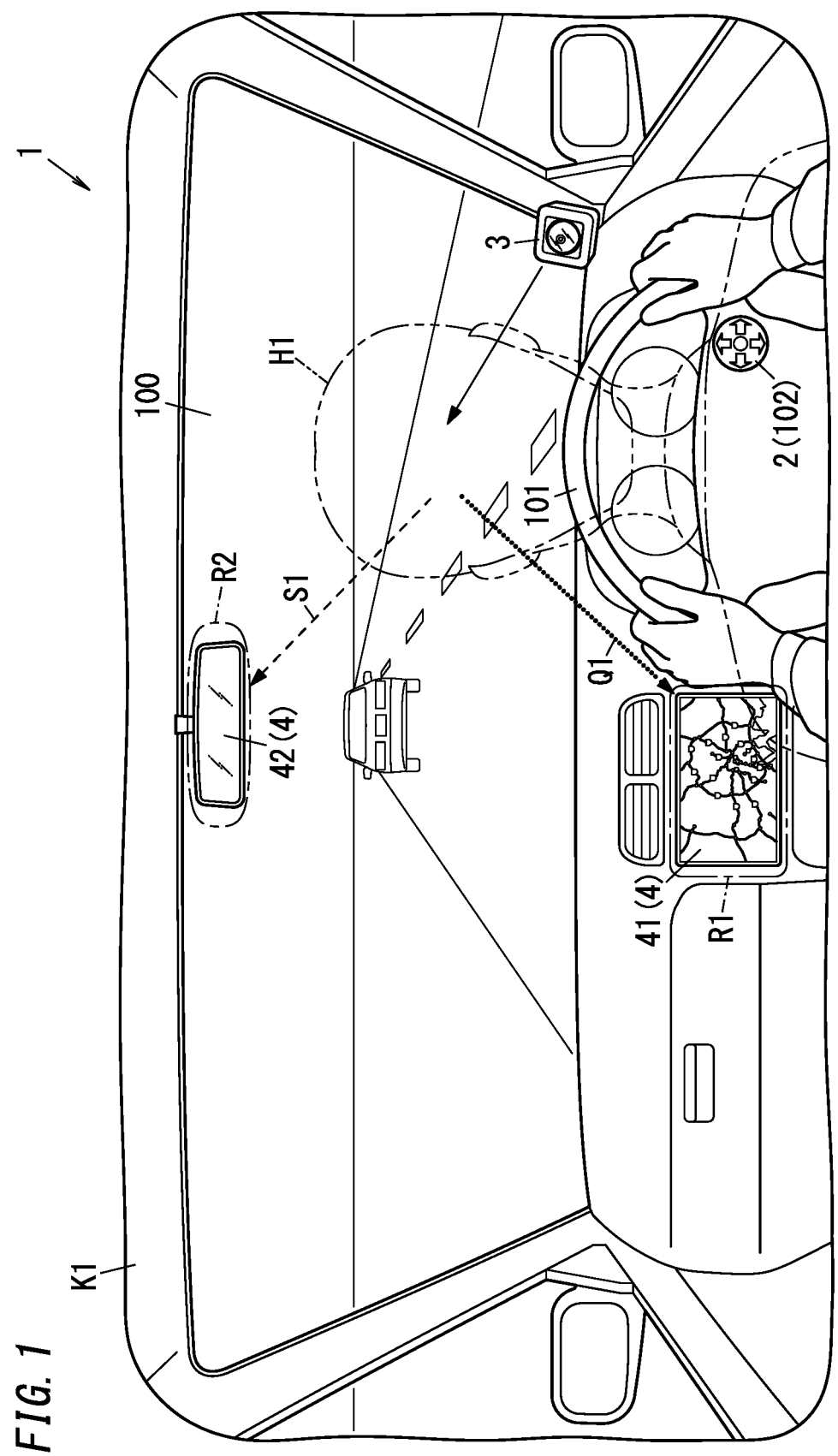
FIG. 1 illustrates how a device control system according to a first embodiment operates.

An overview of the device control system 1 will be described with reference to FIG. 1. FIG. 1 illustrates a view of a driver (user) H1 who is looking straight forward through a windshield 100 from inside a vehicle cabin of a vehicle K1. An electronic mirror 42 is arranged around the center of an upper edge of the windshield 100 of the vehicle. A navigation device 41 is arranged below the center of a lower edge of the windshield 100. In the following description, the "navigation device" will be hereinafter sometimes referred to as a "nav device." Below a lower right corner of the windshield 100, arranged is a steering wheel 101. A steering switch 102 is provided on the steering wheel 101. The steering switch 102 is an operating switch for operating multiple devices 4 (including the navigation device 41 and the electronic mirror 42) installed in the vehicle.

As shown in FIG. 1, the device control system 1 may be used as a piece of onboard equipment for the vehicle, for example, and is a system that allows the driver H1 (user) to control the multiple (e.g., two in the example illustrated in FIG. 1) devices 4 installed in the vehicle by using a first input device 2 and a gaze detector 3. Examples of the multiple devices 4 include the navigation device 41 and the electronic mirror 42. Note that the number of the devices 4 provided does not have to be plural but may also be single. The first input device 2 may be implemented as the steering switch 102, for example. The gaze detector 3 detects the driver's H1 (user's) gaze direction Q1 and determines, based on the gaze direction Q1 detected, any one device 4, selected from the multiple devices 4, to be a control target device to be controlled by the first input device 2. In the following description, the control target device will be hereinafter simply referred to as a "target device." The gaze detector 3 may be, for example, a device that uses a camera for a drive recorder.

More specifically, the gaze detector 3 detects the driver's H1 gaze direction Q1. Then, the gaze detector 3 detects a region R1, R2 (e.g., the region R1 in the example illustrated in FIG. 1) toward which the gaze direction Q1 detected points, and determines a device 4, associated with the region R1, R2 detected, to be the control target device. Note that the region R1, R2 is a region defined in the space inside the vehicle cabin. The region R1 is a range where the navigation device 41 is arranged and is associated with the navigation device 41. The region R2 is a range where the electronic mirror 42 is arranged and is associated with the electronic mirror 42. For example, when the driver H1 turns his or her gaze Q1 on the region R1, the navigation device 41 associated with the region R1 is determined to be the target device. On the other hand, when the driver H1 turns his or her gaze Q1 on the region R2, the electronic mirror 42 associated with the region R2 is determined to be the target device.

Then, the gaze detector 3 changes, based on the gaze direction Q1 detected, the type of the control to be performed in accordance with the command entered through the first input device 2. That is to say, the gaze detector 3 makes the target device change, based on the gaze direction Q1 detected, the type of the processing to be performed in accordance with the command entered through the first input device 2. Changing the type of the processing based on the gaze direction Q1 in this manner either reduces the number of times commands are entered through the first input device 2 or enables a type of processing that known systems cannot perform just by operating the first input device 2 to be performed. For example, the driver H1 may not only choose a musical tune to play through an audio system just by operating the first input device 2 but also have the processing of displaying service area information performed by changing, based on the gaze direction Q1, the type of processing into display of the service area information. This improves the controllability of the target device via the first input device 2. As used herein, the type of the control corresponds to the type of processing to be performed by the target device in accordance with the command entered through the first input device 2.

According to this embodiment, the gaze detector 3 changes, based on the state of the target device when a device is determined to be the target device (hereinafter simply referred to as "target device as selected"), the type of the control to be performed in accordance with the command entered through the first input device 2. That is to say, the gaze detector 3 makes the target device change, based on the state of the target device as selected, the type of the processing to be performed in accordance with the command entered through the first input device 2. This allows the type of the control to be performed in accordance with the command entered through the first input device 2 to be changed into the type of control corresponding to the state of the target device as selected. This allows the driver H1 to operate the first input device 2 simply and intuitively.

Specifically, suppose a situation where the navigation device 41 is determined to be the target device based on the gaze direction Q1 as shown in FIGS. 2A-2D. If an UP button is pressed down on the first input device 2 when the navigation device 41 is in a map display state J1 as in the displayed image P1 shown in FIG. 2A, service area information G2 is displayed on the map image G1 as in the displayed image P2 shown in FIG. 2B. Specifically, the type of control to be performed in accordance with a command entered through the first input device 2 is allowing the driver H1 to choose a musical tune to play on the audio system according to default settings. When the navigation device 41 is in the map display state J1, the type of control is changed into displaying the service area information G2, for example, as a type of control suitable to the map display state J1. Note that the map display state J1 is a state where a map image G1 is displayed on a display area of the navigation device 41. The map image G1 is an image showing a map indicating a route to the vehicle's destination. The displayed images P1, P2 are images displayed on the navigation device 41. The service area information G2 is a piece of information about a service area. Note that pressing the UP button down is an exemplary command entered through the first input device 2.

Figure 2A:
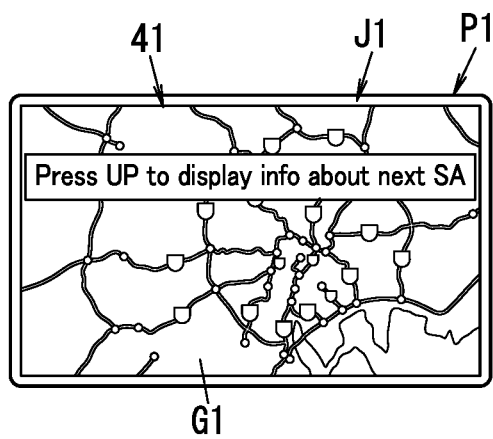
FIGS. 2A and 2B illustrate how the device control system operates when a navigation device is in a map display state.
Figure 2B:
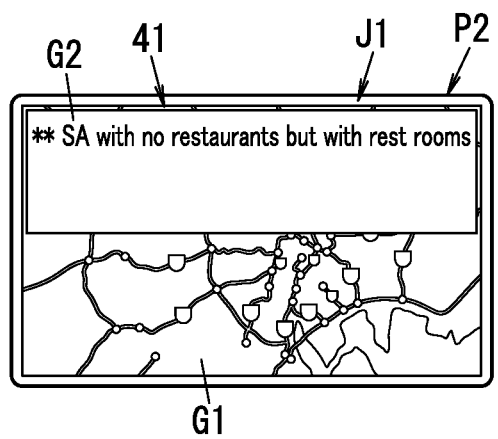
Figure 2C:
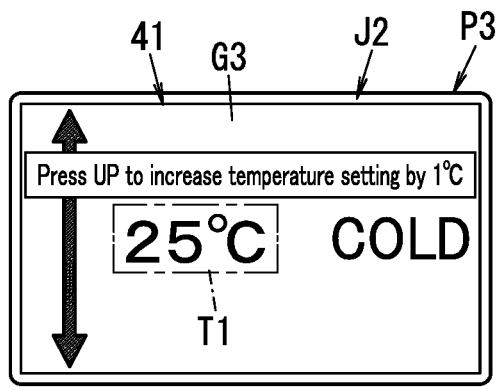
FIGS. 2C and 2D illustrate how the device control system operates when the navigation device is in an air conditioner setting state.
Figure 2D:
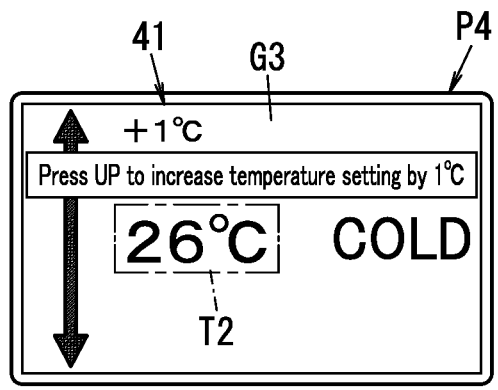

Meanwhile, if the UP button is pressed down on the first input device 2 when the navigation device 41 is in an air conditioner setting state J2 as in the displayed image P3 shown in FIG. 2C, then the temperature setting information T1 (e.g., 25° C.) displayed on the air conditioner setting screen G3 is changed into modified temperature setting information T2 (e.g., 26° C.) as in the displayed image P4 shown in FIG. 2D. Specifically, the type of control to be performed in accordance with a command entered through the first input device 2 is allowing the driver H1 to choose a musical tune to play on the audio system according to default settings. When the navigation device 41 is in the air conditioner setting state J2, the type of control is changed into displaying the modified temperature setting information T2, for example, as a type of control suitable to the air conditioner setting state J2. The displayed images P3, P4 are images displayed on the navigation device 41. The air conditioner setting state is a state where an air conditioner setting screen is displayed. As used herein, the "air conditioner setting screen" is a screen on which the temperature setting of the air conditioner is displayed.

Figure 3:
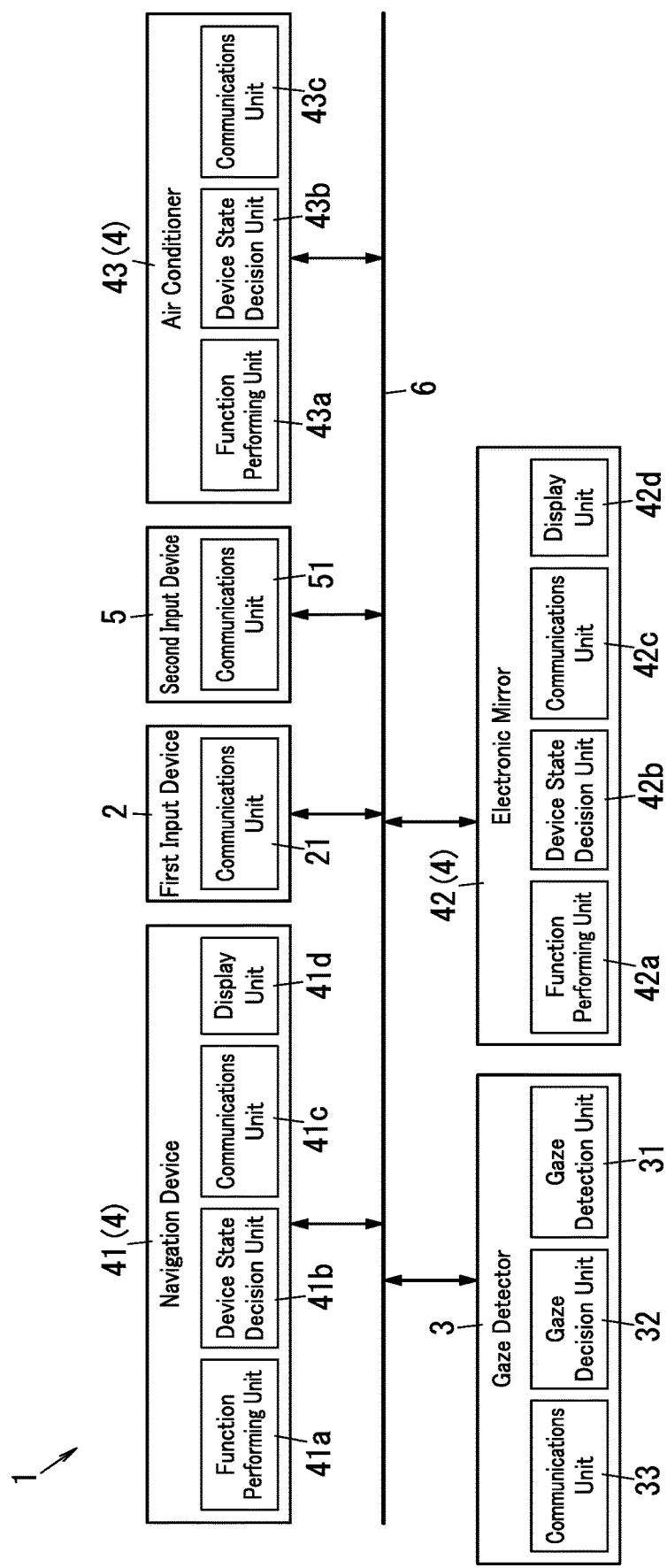
FIG. 3 is a block diagram illustrating a configuration for the device control system.

Next, a configuration for the device control system 1 will be described with reference to FIG. 3. As shown in FIG. 3, the device control system 1 includes the navigation device 41, the electronic mirror 42, an air conditioner 43, the first input device 2, a second input device 5, and the gaze detector 3 (detection device, determination device).

The navigation device 41, the electronic mirror 42, the air conditioner 43, the first input device 2, the second input device 5, and the gaze detector 3 are all connected to a communications network 6 (such as an in-vehicle local area network (LAN)) provided inside the vehicle and may communicate with each other bidirectionally.

The navigation device 41 is a device with the capability of displaying a route to the vehicle's destination and information about service areas located along the route, for example. The navigation device 41 includes a function performing unit 41a, a device state decision unit 41b, a communications unit 41c, and a display unit 41d. Note that the navigation device 41 includes the display unit 41d, and therefore, serves as a display device as well.

The communications unit 41c is a circuit for receiving a control event provided by the first input device 2, a notice of determination provided by the gaze detector 3, and a notice of removal provided by the second input device 5, for example. As used herein, the "control event" refers to the type of control to be performed in accordance with the command entered through the first input device 2 (i.e., the type of control to be performed on the target device). The "notice of determination" means a notice indicating which device 4 has been determined to be the target device. The "notice of removal" means a notice indicating that the target device has been removed from the list of devices to be controlled by the first input device 2.

The device state decision unit 41b is a circuit for deciding, when the navigation device 41 is determined by the gaze detector 3 to be the target device, the state of the navigation device 41 (such as the map display state J1 or the air conditioner setting state J2) at the time of the determination. As used herein, "when the navigation device 41 is determined by the gaze detector 3 to be the target device" may mean, for example, when the communications unit 41c receives the notice of determination indicating that the navigation device 41 is the target device.

The function performing unit 41a is a circuit for performing the functions of the navigation device 41. Examples of the functions of the navigation device 41 include displaying, on the display unit 41d, a route to the vehicle's destination and information about service areas located along the route. Note that the functions of the navigation device 41 are not limited to these. Also, if the communications unit 41c has received not only the notice of determination indicating that the navigation device 41 has been determined to be the target device but also the control event, the function performing unit 41a performs the type of processing corresponding to the state of the navigation device 41 that has been decided by the device state decision unit 41b. That is to say, the gaze detector 3 transmits the notice of determination to the navigation device 41, thereby making the navigation device 41 change the type of processing to be performed by the navigation device 41 into the type of processing corresponding to the state of the navigation device 41 as decided by the device state decision unit 41b.

The display unit 41d may display images representing various types of information. Examples of such images representing various types of information include the map image G1 on the navigation device 41 (see FIG. 2A) and the air conditioner setting screen G3 (see FIG. 2C).

The electronic mirror 42 is a display device for displaying images representing surroundings of the vehicle (such as an image representing a rear view from the vehicle) and captured as a movie by one or more cameras mounted on the vehicle. The electronic mirror 42 also includes a function performing unit 42a, device state decision unit 42b, a communications unit 42c, and a display unit 42d.

The communications unit 42c and the device state decision unit 42b may respectively have the same configuration as the communications unit 41c and device state decision unit 41b of the navigation device 41. The function performing unit 42a is a circuit for performing the functions of the electronic mirror 42. Examples of the functions of the electronic mirror 42 include displaying, on the display unit 42d, an image representing surroundings of the vehicle (such as an image representing a rear view from the vehicle) and captured by the one or more cameras mounted on the vehicle. Also, if the communications unit 42c has received not only the notice of determination indicating that the electronic mirror 42 has been determined to be the target device but also the control event, the function performing unit 42a performs the type of processing corresponding to the state of the electronic mirror 42 that has been decided by the device state decision unit 42b. That is to say, the gaze detector 3 transmits the notice of determination to the electronic mirror 42, thereby making the electronic mirror 42 change the type of processing to be performed by the electronic mirror 42 into the type of processing corresponding to the state of the electronic mirror 42 as decided by the device state decision unit 42b. The display unit 42d is a display device which may display images representing various types of information thereon. Examples of the images representing various types of information include images captured by the one or more cameras.

The air conditioner 43 includes a function performing unit 43a, a device state decision unit 43b, and a communications unit 43c. The communications unit 43c and the device state decision unit 43b may respectively have the same configuration as the communications unit 41c and device state decision unit 41b of the navigation device 41. The function performing unit 43a is a circuit for performing the functions of the air conditioner 43. Examples of the functions of the air conditioner 43 include adjusting the temperature inside the vehicle cabin to a temperature setting by supplying either hot air or cold air into the vehicle cabin. Also, if the communications unit 43c has received not only the notice of determination indicating that the air conditioner 43 has been determined to be the target device but also the control event, the function performing unit 43a performs the type of processing corresponding to the state of the air conditioner 43 that has been decided by the device state decision unit 43b. That is to say, the gaze detector 3 transmits the notice of determination to the air conditioner 43, thereby making the air conditioner 43 change the type of processing to be performed by the air conditioner 43 into the type of processing corresponding to the state of the air conditioner 43 as decided by the device state decision unit 43b.

The first input device 2 is a device that allows a command to be entered with respect to the target device, and may be implemented as, for example, the steering switch 102 (see FIG. 1). The first input device 2 includes a communications unit 21. When a command with respect to the target device is entered through the first input device 2, the communications unit 21 transmits the control event to the respective devices 4 (including the navigation device 41, the electronic mirror 42, and the air conditioner 43).

The second input device 5 is a device that allows a remove command to be entered. The remove command instructs that the target device should be removed from the list of devices to be controlled by the first input device 2. The second input device 5 may be implemented as, for example, a predetermined operating switch provided for the steering wheel 101. The second input device 5 includes a communications unit 51. When the remove command is entered through the second input device 5, the communications unit 51 transmits a notice of removal to the effect to the respective devices 4 (including the navigation device 41, the electronic mirror 42, and the air conditioner 43). On receiving the notice of removal, the device 4 that has been determined to be the target device is removed from the list of devices to be controlled by the first input device 2. That is to say, by transmitting the notice of removal to the target device in accordance with the remove command entered, the second input device 5 has the target device removed from the list of devices to be controlled by the first input device 2.

The gaze detector 3 includes a gaze detection unit 31 (detection device), a gaze decision unit 32 (determination unit), and a communications unit 33.

The gaze detection unit 31 is a circuit for detecting the gaze direction Q1 (see FIG. 1) of the user's (such as the vehicle driver's). The gaze decision unit 32 is a circuit for determining, based on the gaze direction Q1 detected by the gaze detection unit 31, one device, selected from the multiple devices 4 (including the navigation device 41, the electronic mirror 42, and the air conditioner 43), to be the target device for the first input device 2. In this embodiment, the gaze decision unit 32 determines a device 4, on which the driver H1 is turning his or her gaze Q1, to be the target device. More specifically, each of the multiple devices 4 is associated with a region R1, R2, . . . in the vehicle cabin (see FIG. 1). For example, the navigation device 41 is associated with the region R1 and the electronic mirror 42 is associated with the region R2. The gaze decision unit 32 detects, based on the gaze direction Q1 detected, the region R1, R2, . . . on which the driver H1 is turning his or her gaze Q1, decides, based on the association, which device 4 is associated with the region detected R1, R2, . . . , and determines the device 4 to be target device. When the gaze decision unit 32 determines the target device, the communications unit 33 transmits a notice of determination, indicating which device 4 has been determined to be the target device, to the multiple devices 4 (including the navigation device 41, the electronic mirror 42, and the air conditioner 43).

Note that each of the function performing units 41a, 42a, 43a is implemented as, for example, a microcomputer (computer system) including, as its major constituent elements, a CPU and a memory. In other words, each of the function performing units 41a-43a is a computer including a CPU and a memory. The computer performs the functions of the function performing units 41a-43a by making the CPU execute a program stored in the memory. In this embodiment, the program is stored in advance in the memory. Alternatively, the program may also be downloaded via a telecommunications line such as the Internet or distributed after having been stored in a storage medium such as a memory card. Likewise, each of the communications units 41c-43c, 21, 51, 33, the gaze detection unit 31, and the gaze decision unit 32 may also be implemented as, for example, a microcomputer including, as major constituent elements, a CPU and a memory.

Figure 4:
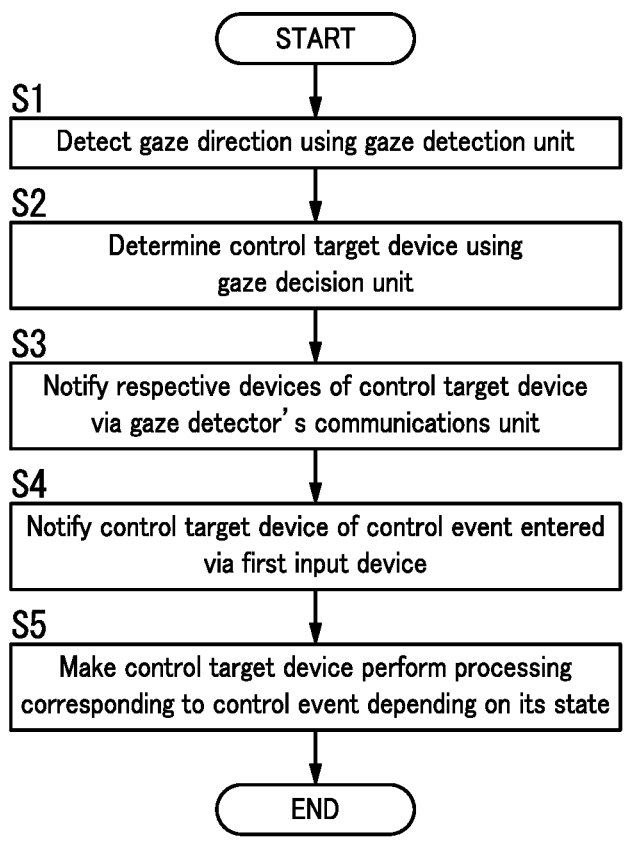
FIG. 4 is a flowchart showing the procedure of operation of the device control system.

Next, it will be described with reference to FIG. 4 how the device control system 1 operates.

In the gaze detector 3, the gaze detection unit 31 detects the driver's gaze direction Q1 (in S1). Then, the gaze decision unit 32 decides, based on the gaze direction Q1 detected by the gaze detection unit 31, on which device 4 the driver H1 is turning his or her gaze Q1 and determines that the device 4 thus spotted should be the target device. That is to say, the gaze decision unit 32 determines one device 4, selected from the multiple devices 4 (including the navigation device 41, the electronic mirror 42, and the air conditioner 43), to be the target device (in S2). Then, the communications unit 33 transmits (gives) a notice of determination, indicating which device 4 has been determined to be the target device, to the respective devices 4 (including the navigation device 41, the electronic mirror 42, and the air conditioner 43) (in S3). Thereafter, when a command with respect to the target device is entered through the first input device 2, the first input device 2 transmits information about the type of the control to be performed in accordance with the command (i.e., the control event) to the target device (in S4). The target device performs processing corresponding to the control event depending on its state when the target device receives the control event (in S5).

As can be seen from the foregoing description, in the device control system 1 according to this embodiment, the target device changes, based on the gaze direction Q1, the type of the processing to be performed in accordance with the command entered through the first input device 2. Changing the type of the processing based on the gaze in this manner either reduces the number of times commands are entered through the first input device 2 or enables a type of processing that known systems cannot perform just by operating the first input device 2 to be performed. This improves the controllability of the target device via the first input device 2.

In addition, this also allows the driver to perform, via the first input device 2, a type of control corresponding to the state of the target device. Consequently, the driver may operate the first input device 2 simply and intuitively.

Specific exemplary operations of the device control system 1 according to the first embodiment will be described as second through tenth embodiments. In the following description, any constituent element of the second through tenth embodiments, having the same function as a counterpart of the first embodiment described above, will be designated by the same reference numeral as that counterpart's, and description thereof will be omitted herein.

Second Embodiment

In the following description of the second embodiment, it will be described with reference to FIG. 5 how the device control system 1 operates when the navigation device 41 is determined to be the target device while the vehicle is running down an expressway. In the following description, the state of the navigation device 41 is supposed to be either the map display state or the air conditioner setting state.

Figure 5:
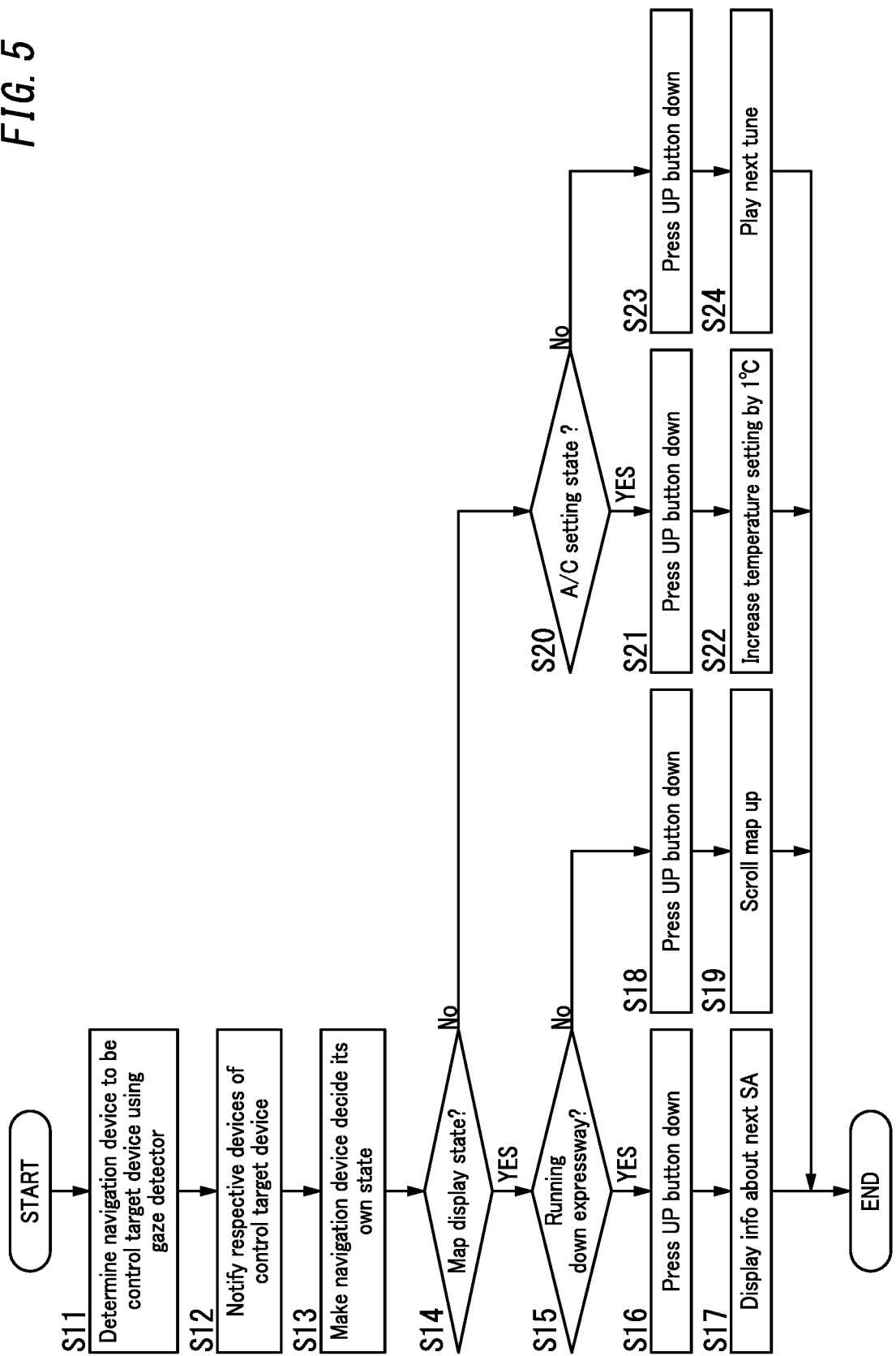
FIG. 5 is a flowchart showing the procedure of operation of a device control system according to a second embodiment.

As shown in FIG. 5, the gaze detector 3 decides that the driver should be turning his or her gaze Q1 on the navigation device 41, thus determining the navigation device 41 to be the target device (in S11). Then, the (gaze decision unit 32 of the) gaze detector 3 transmits a notice of determination indicating that the navigation device 41 has been determined to be the target device to all of the multiple devices 4 (in S12). On receiving the notice of determination, the (device state decision unit 41b of the) navigation device 41 decides the state of the navigation device 41 itself (in S13). If a decision is made that the navigation device 41 should be in the map display state J1 (see the displayed image P1 shown in FIG. 2A) (if the answer is YES in S14), the (device state decision unit 41b of the) navigation device 41 decides whether or not the vehicle is running down an expressway (in S15). If a decision is made that the vehicle should be running down an expressway (if the answer is YES in S15) and an UP button is pressed down on the first input device 2 (in S16), the (function performing unit 41a of the) the navigation device 41 displays service area information G2 (see the displayed image P2 shown in FIG. 2B) on the display unit 41d of the navigation device 41 (in S17). In that case, if it turns out that the navigation device 41 is in the map display state J1 and that its vehicle on the map image G1 is running down an expressway, the (function performing unit 41a of the) navigation device 41 performs the processing of displaying the service area information as a type of processing corresponding to this state. Then, the process ends.

On the other hand, if the decision is made in Step S15 that the vehicle should not be running down an expressway (if the answer is NO in S15) and the UP button is pressed down on the first input device 2 (in Step S18), then the (function performing unit 41a of the) navigation device 41 scrolls the map image G1 upward on the screen (in Step S19). In that case, if it turns out that the navigation device 41 is in the map display state J1 and that its vehicle on the map image G1 is not running down an expressway, the (function performing unit 41a of the) navigation device 41 performs the processing of scrolling the map image G1 upward on the screen as a type of processing corresponding to this state. Then, the process ends.

Meanwhile, if the decision is made in Step S14 that the navigation device 41 should not be in the map display state J1 (if the answer is NO in S14), the (device state decision unit 41b of the) navigation device 41 decides whether or not the navigation device 41 is in the air conditioner setting state J2 (see the displayed image P3 shown in FIG. 2C) (in S20). If the decision is made that the navigation device 41 should be in the air conditioner setting state J2 (if the answer is YES in S20) and the UP button is pressed down on the first input device 2 (in S21), the (function performing unit 41a of the) navigation device 41 increases the temperature setting information T1 (of 25° C., for example) displayed on the air conditioner setting screen G3 (see the displayed image P4 shown in FIG. 2D) by one degree to change the temperature setting information T1 into modified temperature setting information T2 (of 26° C., for example; see the displayed image P4 shown in FIG. 2C) (in S22). In that case, if it turns out that the navigation device 41 is in the air conditioner setting state J2, the (function performing unit 41a of the) navigation device 41 performs the processing of increasing the temperature setting information T1 displayed on the air conditioner setting screen G3 by one degree to change the temperature setting information T1 into modified temperature setting information T2 as a type of processing corresponding to this state. Then, the process ends.

On the other hand, if the decision is made in Step S20 that the navigation device 41 should not be in the air conditioner setting state J2 (if the answer is NO in S20) and the UP button is pressed down on the first input device 2 (in S23), then the (function performing unit 41a of the) navigation device 41 plays the next musical tune on the audio system (in S24). In that case, the navigation device 41 is in neither the map display state J1 nor the air conditioner setting state J2, the (function performing unit 41a of the) navigation device 41 performs, as a predetermined type of processing (default processing), the processing of playing the next musical tune. Then, the process ends.

Third Embodiment

Next, it will be described with reference to FIG. 6 how a device control system 1 according to a third embodiment operates when the driver H1 is turning his or her gaze Q1 on none of the multiple devices 4. In that case, a device 4 to be selected by default (i.e., a predetermined device) from the multiple devices 4 is determined to be the target device. In that case, the target device performs a predetermined type of processing set by default, irrespective of the state of the target device, in accordance with the command entered through the first input device 2.

As can be seen, if the driver H1 turns his or her gaze Q1 on none of the multiple devices 4, determining a device 4 selected by default to be the target device allows the device control system 1 to avoid a situation where there are no target devices to be controlled by the first input device 2. In the following description, such a device 4 to be selected by default will be hereinafter referred to as a "default device." It will be described in detail how the device control system 1 operates in such a situation.

Figure 6:
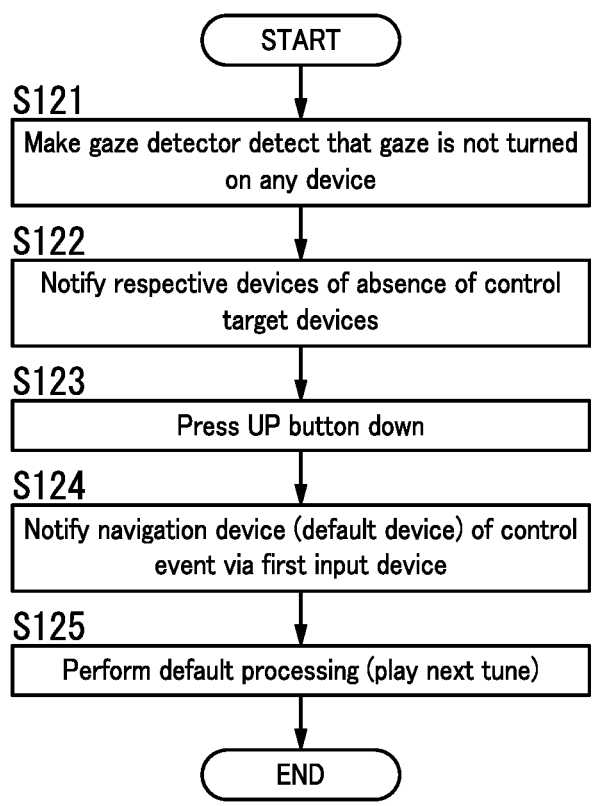
FIG. 6 is a flowchart showing the procedure of operation of a device control system according to a third embodiment.

As shown in FIG. 6, the (gaze decision unit 32 of the) gaze detector 3 detects that the driver turns his or her gaze Q1 on none of the multiple devices 4 (in S121). Then, the (gaze decision unit 32 of the) gaze detector 3 transmits a notice of absence indicating that there are no target devices to all of the multiple devices 4 (in S122). In this embodiment, the navigation device 41 is supposed to be selected by default if the driver H1 turns his or her gaze Q1 on none of the multiple devices 4. On receiving the notice of absence, the navigation device 41 selected by default serves as the target device. That is to say, by transmitting the notice of absence to the navigation device 41, the (gaze decision unit 32 of the)

gaze detector 3 determines the navigation device 41, which is supposed to be selected by default, to be the target device. Then, when the UP button is pressed down on the first input device 2 (in S123), the first input device 2 transmits the control event to the navigation device 41 as the target device (in S124). Then, in accordance with the control event received, the navigation device 41 performs, as the processing to be selected by default, the processing of playing the next musical tune (in S125). That is to say, the navigation device 41 performs the processing of playing musical tunes on the audio system as the processing to be selected by default irrespective of its state.

Note that, in Step S122, the first input device 2 transmits the control event to all of the multiple devices 4. In this case, all the devices 4 but the target device invalidate the control event received and only the target device performs the control event received in Step S122.

In the exemplary operation described above, the navigation device 41 is determined to be the target device based on the driver's gaze direction Q1. Then, the gaze detector 3 transmits the notice of absence to the navigation device 41, thus making the navigation device 41 change, based on the driver's gaze direction Q1, the type of processing to be performed in accordance with the command entered through the first input device 2 from a certain type of processing into the musical tune replay processing.

Fourth Embodiment

Next, it will be described with reference to FIG. 7 how a device control system 1 according to a fourth embodiment operates when the user removes the target device from the list of devices to be controlled by the first input device 2 by entering a remove command through the second input device 5.

In the following description, if the target device is removed from the list of devices to be controlled by the first input device 2, then a device to be selected by default (such as the navigation device 41) is determined to be the target device. In that case, the target device will perform the processing to be selected by default (such as the processing of playing the next musical tune) irrespective of its state.

Figure 7:
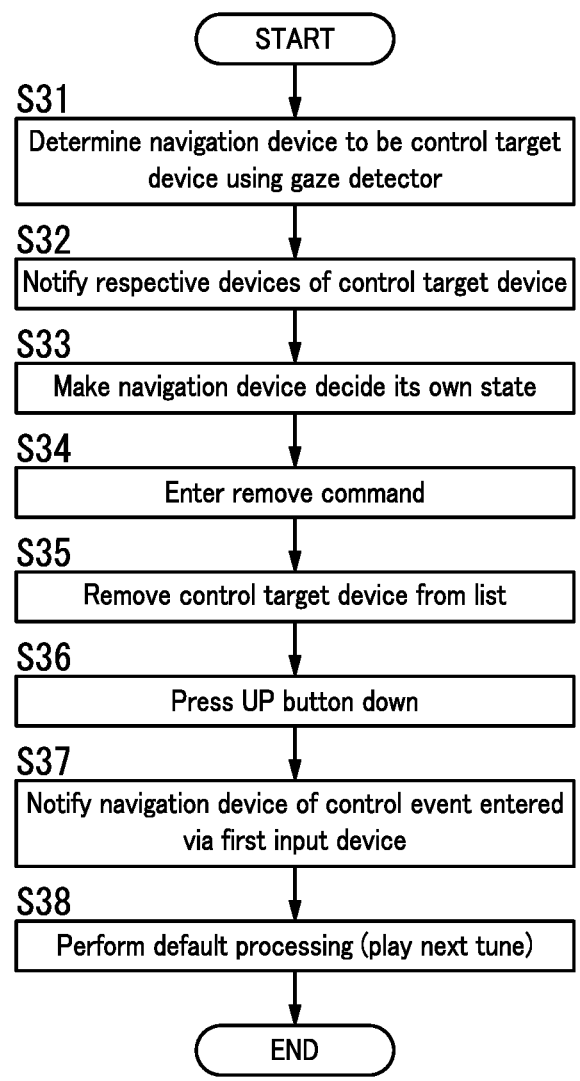
FIG. 7 is a flowchart showing the procedure of operation of a device control system according to a fourth embodiment.

Steps S31-S33 shown in FIG. 7 are respectively the same as Steps S11-S13 shown in FIG. 5, and therefore, description thereof will be omitted herein. Thus, only Step S34 shown in FIG. 7 and the steps that follow it will be described in the following description.

In Step S34, the user enters a remove command through the second input device 5. In response, the second input device 5 transmits a notice of removal to all of the multiple devices 4. The notice of removal is a notice indicating that the remove command has been entered through the second input device 5. Then, when the navigation device 41 as the target device receives the notice of removal, the navigation device 41 is removed from the list of devices to be controlled (in S35). That is to say, when the remove command is entered through the second input device 5, the second input device 5 transmits the notice of removal to the navigation device 41, thereby removing the navigation device 41 from the list of devices to be controlled by the first input device 2. In this example, the navigation device 41 is a device 4 to be selected by default (i.e., a default device). Thus, on receiving the notice of removal, the navigation device 41 serves as the target device. Nevertheless, the target device to be selected by default performs the processing to be selected by default in accordance with the command entered through the first input device 2 irrespective of the state of the target device.

Then, when the UP button is pressed down on the first input device 2 (in S36), the first input device 2 transmits a control event to the navigation device 41 (in S37). On receiving the control event, the navigation device 41 selected by default as the target device performs the processing to be selected by default (i.e., the processing of playing the next musical tune) in accordance with the control event (in S38). Then, the process ends.

In this example, the navigation device 41 is initially determined to be the target device based on the driver's gaze direction Q1. In this state, when the UP button is pressed down on the first input device 2, for example, the navigation device 41 performs processing corresponding to the state of the navigation device 41 when the navigation device 41 is determined to be the target device (e.g., displaying information about the next service area). However, if the navigation device 41 that has been once removed from the list of devices to be controlled is selected as the target device in accordance with the remove command, the navigation device 41 performs, when the UP button is pressed down on the first input device 2, for example, the processing to be selected by default (such as the processing of playing the next musical tune) irrespective of the state of the navigation device 41.

According to this embodiment, even if a device 4 has once been determined to be the target device based on the driver's gaze direction Q1, the device 4 selected as the target device for the first input device 2 may be made to perform another type of processing, irrespective of the state of the target device, by entering the remove command through the second input device 5.

Fifth Embodiment

Next, it will be described with reference to FIG. 8 and FIGS. 9A-9C how a device control system 1 according to a fifth embodiment operates when displaying an operation guidance (operation guidance information). The operation guidance is information about available types of control to be performed by operating the first input device 2. More specifically, the operation guidance is information about correspondence between a command that may be entered through the first input device 2 and the type of processing to be performed on the target device and allocated to the command.

Figure 8:
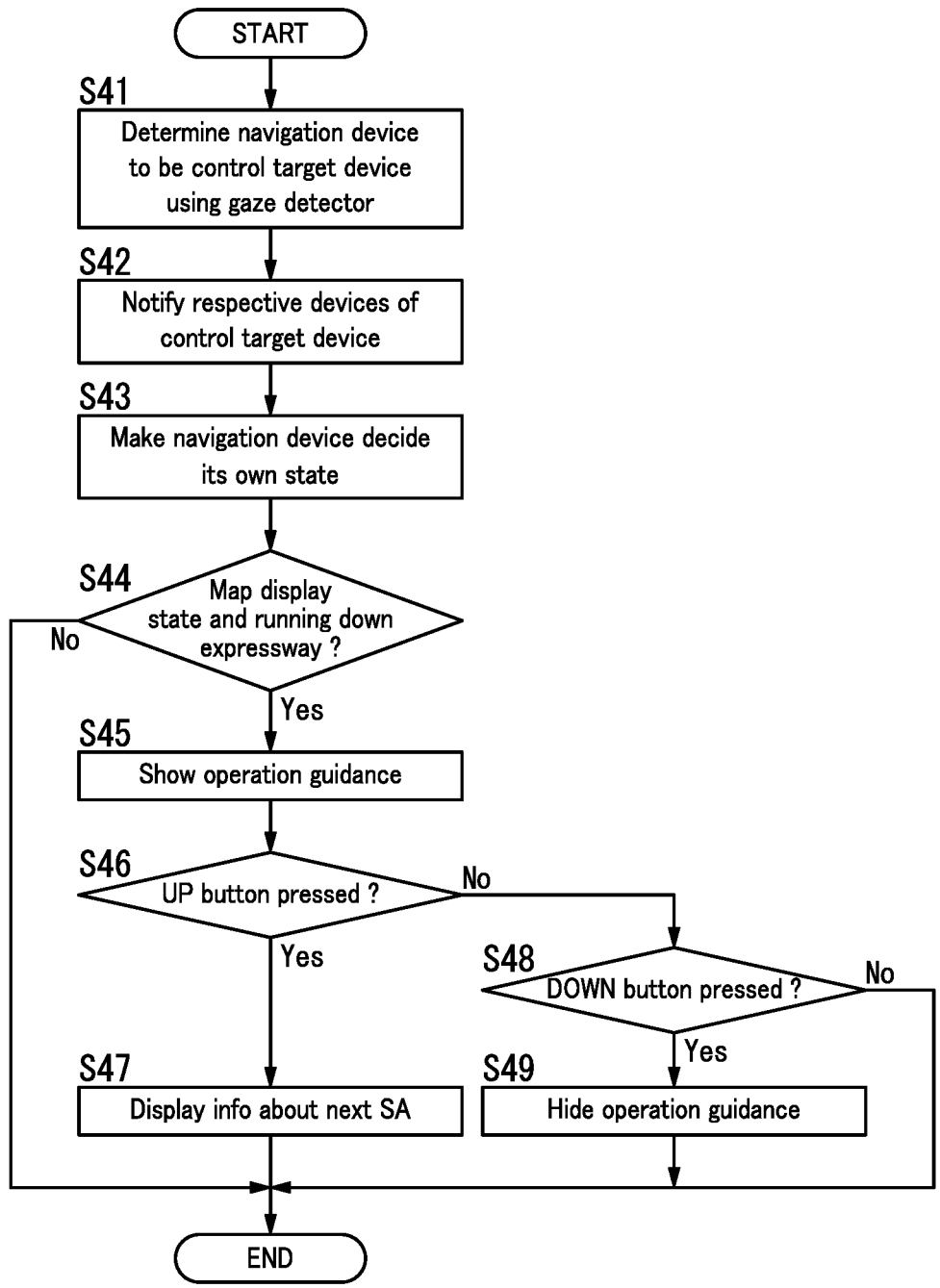
FIG. 8 is a flowchart showing the procedure of operation of a device control system according to a fifth embodiment.

Steps S41-S43 shown in FIG. 8 are respectively the same as Steps S11-S13 shown in FIG. 5, and therefore, description thereof will be omitted herein. Thus, only Step S44 shown in FIG. 8 and the steps that follow it will be described in the following description.

Figure 9A:
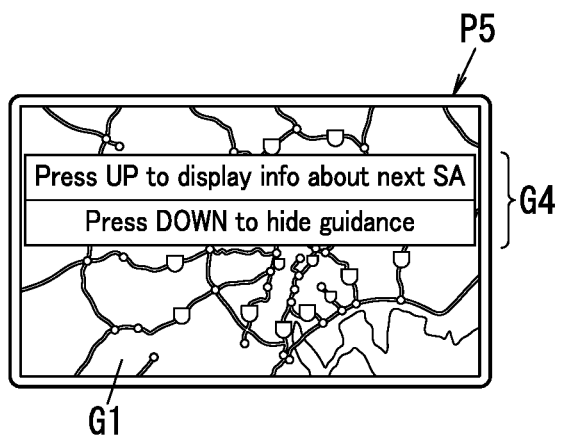
FIGS. 9A-9C illustrate how the device control system operates.
Figure 9B:
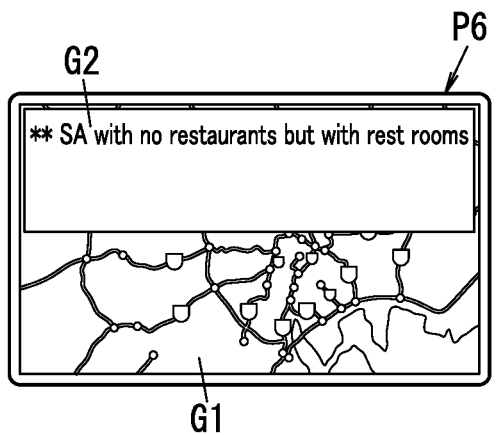
Figure 9C:
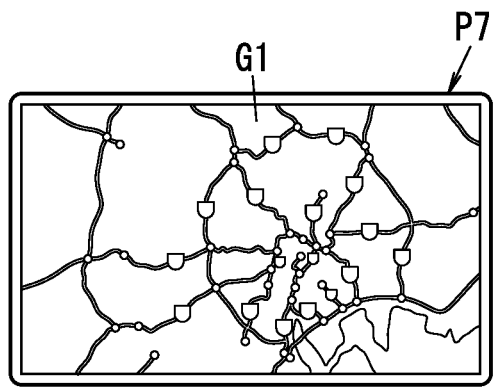

In Step S44, if the navigation device 41 is in the map display state and the vehicle K1 on the map image is running down an expressway (if the answer is YES in S44), the navigation device 41 displays an operation guidance G4 on the display unit 41d as in the displayed image P5 shown in FIG. 9A (in S45). Note that in the displayed image P5 shown in FIG. 9A, the operation guidance G4 is shown on the display unit 41d to be superimposed on the map image G1. Note that the displayed image P5 is an image displayed on the navigation device 41. That is to say, the (gaze decision unit 32 of the) gaze detector 3 transmits a notice of determination to the navigation device 41 to determine the navigation device 41 to be the target device (in S42) and have the navigation device 41, also serving as a display device, display the operation guidance G4 thereon (in S45).

Then, when the UP button is pressed down on the first input device 2 (if the answer is YES in S46), the first input device 2 transmits a control event indicating that the UP button has been pressed down to the navigation device 41. On receiving the control event, the navigation device 41 performs, as processing corresponding to the state of the navigation device 41 when the navigation device 41 is determined to be the target device, the processing of displaying service area information G2 on the display unit 41*d* as in the displayed image P6 shown in FIG. 9B (in S47). In the displayed image P6 shown in FIG. 9B, the service area information G2 is displayed on the display unit 41*d* to be superimposed on the map image G1. Note that the displayed image P6 is an image displayed on the navigation device 41.

On the other hand, if it turns out in Step S46 that the UP button is not pressed down on the first input device 2 (if the answer is NO in S46) but the DOWN button is pressed down on the first input device 2 (if the answer is YES in S48), the first input device 2 transmits a control event indicating that the DOWN button has been pressed down to the navigation device 41. On receiving the control event, the navigation device 41 stops displaying the operation guidance G4 on the display unit 41*d* as in the displayed image P7 shown in FIG. 9C (in S49). Note that the displayed image P7 is an image displayed on the navigation device 41. Then, the process ends. On the other hand, if it turns out in Step 48 that the DOWN button is not pressed down on the first input device 2 (if the answer is NO in S48), then the process ends.

As can be seen from the foregoing description, when the device control system 1 determines a desired device 4 to be the target device with the driver's gaze Q1 turned on the desired device 4, the operation guidance G4 is shown on the display unit 41*d* according to the state of the desired device 4 when the device 4 is determined to be the target device. The type of processing by the target device to be controlled in accordance with the command entered through the first input device 2 varies according to the state of the device when the device is determined to be the target device. However, the contents of the operation guidance G4 correspond to the type of processing that varies. In the device control system 1, the type of the control to be performed in accordance with the command entered through the first input device 2 varies according to the state of the device 4 when the device 4 is determined to be the target device. Nevertheless, displaying the operation guidance G4 allows the user to easily understand the type of the control to be performed in accordance with the command entered through the first input device 2. In addition, display of the operation guidance G4 may be stopped just by operating the first input device 2 (pressing down the DOWN button). Thus, when the operation guidance G4 is unnecessary, the display of the operation guidance G4 may be readily cancelled.

Sixth Embodiment

Next, it will be described with reference to FIG. 10 how a device control system 1 according to a sixth embodiment operates to automatically stop displaying the operation guidance G4. In this example, when the driver turns his or her gaze Q1 on a device 4 (i.e., a device to be determined to be the target device), the operation guidance G4 is shown on the display unit 41*d*. Then, when the driver turns his or her gaze Q1 away from the device 4 (e.g., all of the multiple devices 4), the operation guidance G4 automatically stops being shown. It will be described in detail how the device control system 1 operates in such a situation.

Figure 10:
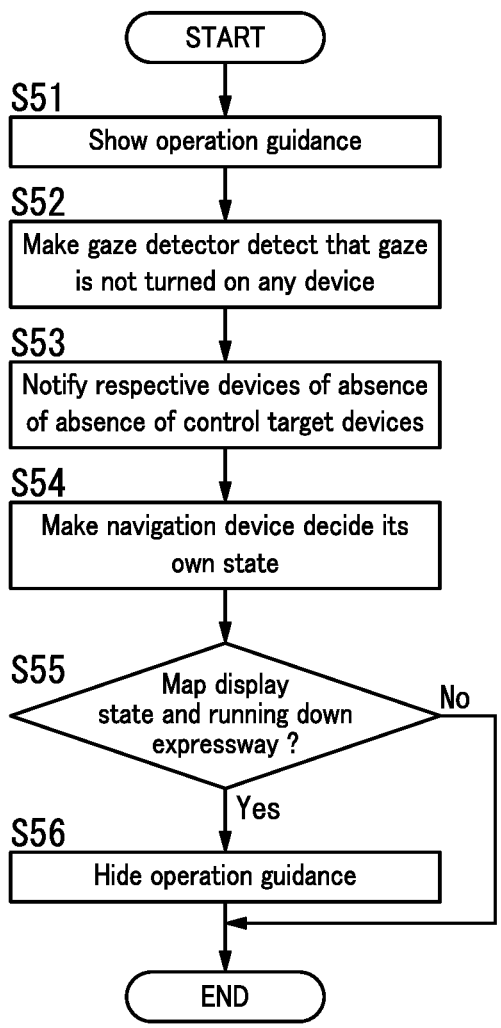
FIG. 10 is a flowchart showing the procedure of operation of a device control system according to a sixth embodiment.

As shown in FIG. 10, in Step S51, the driver turns his or her gaze Q1 on the navigation device 41, thus determining the navigation device 41 to be the target device. Then, the operation guidance G4 is shown on the display unit 41*d* of the navigation device 41. Thereafter, the driver turns his or her gaze away from all of the multiple devices 4 (including the navigation device 41) and the (gaze decision unit 32 of the) gaze detector 3 detects that the driver is not turning his or her gaze Q1 on any of the devices 4 (in S52). In such a situation, the (gaze decision unit 32 of the) gaze detector 3 transmits a notice of absence indicating that there are no target devices to all of the multiple devices 4 (in S53). When the navigation device 41 receives the notice of absence, the navigation device 41 is removed from the list of devices to be controlled.

Then, the navigation device 41 decides its own state (in S54). If a decision is made that the navigation device 41 should be in the map display state and the vehicle on the map image is running down an expressway (if the answer is YES in S55), the navigation device 41 stops showing the operation guidance G4 on the display unit 41*d* (in S56). That is to say, the (gaze decision unit 32 of the) gaze detector 3 transmits a notice of absence to the navigation device 41 to remove the navigation device 41 from the list of devices to be controlled (in S53) and to make the navigation device 41, also serving as the display device, stop showing the operation guidance G4 thereon (in S56). Note that in this example, the operation guidance G4 is supposed to be shown only when the navigation device 41 is in the map display state and the vehicle on the map image is running down an expressway.

On the other hand, if the decision is made in Step S54 that the navigation device 41 should not be in the map display state and the vehicle on the map image should not be running down an expressway (if the answer is NO in S55), then the operation guidance G4 is not shown. Therefore, the process ends.

Seventh Embodiment

Next, it will be described with reference to FIG. 11 how a device control system 1 according to a seventh embodiment operates when a device 4, on which the driver's gaze Q1 has been fixed for a certain period of time, is determined to be the target device. This reduces the chances of a device 4, toward which the driver H1 happens to turn his or her gaze Q1 just accidentally, being determined to be the target device against the driver's will. In this embodiment, when the target device is determined, the operation guidance G4 indicating the commands to be entered with respect to the target device is shown. It will be described in detail how the device control system 1 according to the seventh embodiment operates in such a situation.

Figure 11:
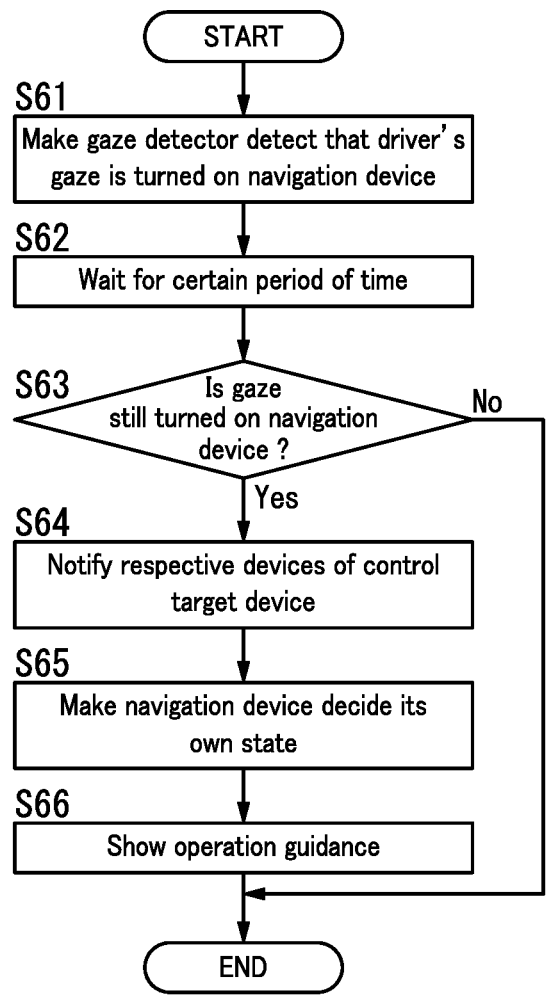
FIG. 11 is a flowchart showing the procedure of operation of a device control system according to a seventh embodiment.

As shown in FIG. 11, in Step S61, the (gaze decision unit 32 of the) gaze detector 3 decides that the driver should be turning his or her gaze Q1 on the navigation device 41. Then, the (gaze decision unit 32 of the) gaze detector 3 waits for the certain period of time since when the driver has turned his or her gaze Q1 on the navigation device 41 (in S62). Then, the gaze detector 3 decides whether or not the driver is still turning his or her gaze Q1 on the navigation device 41 (in S63). That is to say, the (gaze decision unit 32 of the) gaze detector 3 decides whether or not the driver's gaze Q1 has been fixed on the navigation device 41 for the certain period of time. If a decision is made that the driver's gaze Q1 should have been fixed on the navigation device 41 for the certain period of time (if the answer is YES in S63), the (gaze decision unit 32 of the) gaze detector 3 determines the navigation device 41 to be the target device and transmits a notice of determination, indicating that the navigation device 41 has been determined to be the target device, to all of the multiple devices 4 (in S64). On receiving the notice of determination, the (device state decision unit 41b of the) navigation device 41 serves as the target device. That is to say, the (gaze decision unit 32 of the) gaze detector 3 transmits the notice of determination to the navigation device 41, on which the driver's gaze Q1 has been fixed for the certain period of time, thereby determining the navigation device 41 to be the target device.

Then, the navigation device 41 decides its own state (in S65). Thereafter, depending on the state of the navigation device 41 thus decided, the navigation device 41 shows the operation guidance G4 on the display unit 41d. Then, the process ends. On the other hand, if a decision is made in Step S65 that the driver's gaze Q1 should not have been fixed on the navigation device 41 for the certain period of time (if the answer is NO in S63), the process ends with the navigation device 41 not determined to be the target device.

In this exemplary embodiment, a device 4, on which the driver's gaze Q1 has been fixed for the certain period of time, is determined to be the target device. However, this is only an example of the present disclosure and should not be construed as limiting. Alternatively, as soon as the driver turns his or her gaze Q1 on a device 4, the device 4 may be determined to be target device immediately.

Eighth Embodiment

Next, it will be described with reference to FIG. 12 how a device control system 1 according to an eighth embodiment operates when the target device, from which the driver's gaze Q1 has been away for a certain period of time, is removed from the list of devices to be controlled. This reduces the chances of a device 4, from which the gaze happens to be tuned away just accidentally, being removed, against the driver's will, from the list of devices to be controlled. In this embodiment, when the driver's gaze Q1 has been away from the target device for the certain period of time, the operation guidance G4 indicating the commands to be entered with respect to the target device stops being shown. It will be described in detail how the device control system 1 according to the eighth embodiment operates in such a situation.

Figure 12:
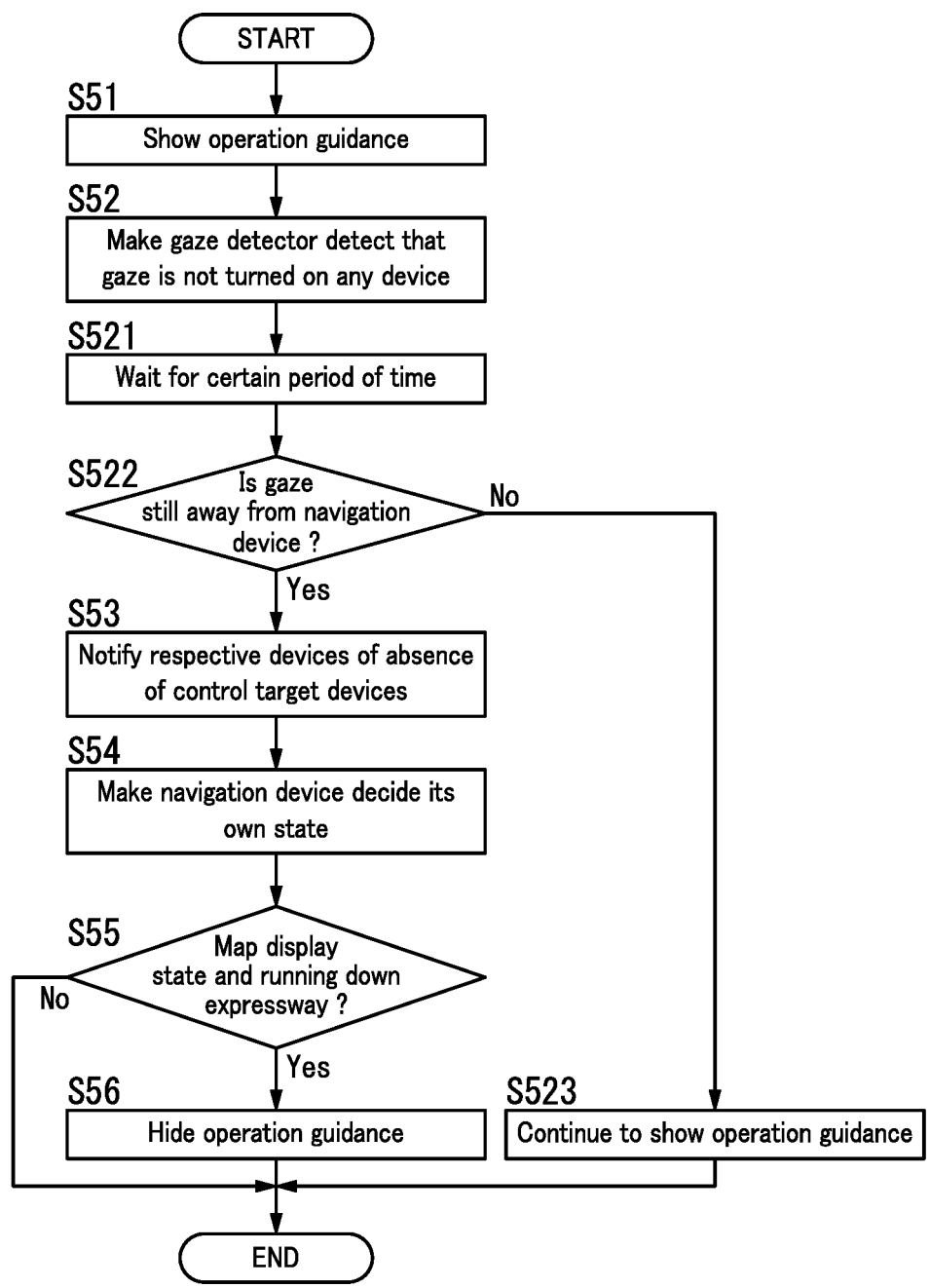
FIG. 12 is a flowchart showing the procedure of operation of a device control system according to an eighth embodiment.

The flowchart shown in FIG. 12 includes not only all the processing steps of the flowchart shown in FIG. 10 but also three additional processing steps S521, S522, and S523. That is to say, Steps S51-S55 shown in FIG. 12 are respectively the same as Steps S51-S5 shown in FIG. 10, and therefore, description thereof will be omitted herein. Thus, only the three additional processing steps S521, S522, and S523 shown in FIG. 12 will be described in the following description.

As shown in FIG. 12, in Step S521, the (gaze decision unit 32 of the) gaze detector 3 waits for the certain period of time since it has been detected in Step S52 that the driver is not turning his or her gaze Q1 on any of the multiple devices 4. Then, the gaze detector 3 decides whether or not the driver's gaze Q1 is still away from the navigation device 41 (in S522). That is to say, the gaze detector 3 decides whether or not the driver's gaze Q1 has been away from the navigation device 41 for the certain period of time. If a decision is made that the driver's gaze Q1 should have been away from the navigation device 41 for the certain period of time (if the answer is YES in S522), then the process proceeds to Step S53, in which the (gaze decision unit 32 of the) gaze detector 3 transmits a notice of absence, indicating that there are no target devices, to all of the multiple devices 4 (in S53). On receiving the notice of absence, the navigation device 41 is removed from the list of devices to be controlled. That is to say, if the gaze Q1 has been away from the navigation device 41 (target device) for the certain period of time (if the answer is YES in S522), then the (gaze decision unit 32 of the) gaze detector 3 transmits the notice of absence to the navigation device 41 (in S53), thereby removing the navigation device 41 from the list of devices to be controlled. Then, the process proceeds to Step S54. The rest of the process from Step S54 on will be performed as already described with reference to FIG. 10.

On the other hand, if the decision made in Step S522 is negative (if the answer is NO in S522), then the driver's gaze Q1 has not been away from the navigation device 41 for the certain period of time. In that case, the (gaze decision unit 32 of the) gaze detector 3 does not remove the navigation device 41 from the list of devices to be controlled but still regards the navigation device 41 as the target device. Thus, the navigation device 41 continues to show the operation guidance G4 on the display unit 41d (in S523). Then, the process ends.

Ninth Embodiment

Next, it will be described with reference to FIG. 13 and FIGS. 14A-14C how a device control system 1 according to a ninth embodiment operates to change, when the driver turns his or her gaze Q1 on a particular region of the target device, the type of control to be performed in accordance with the command entered through the first input device 2 into a type of control associated with the particular region. This configuration allows the type of control to be performed on the target device via the first input device 2 to be changed into a type of control associated with the particular region just by turning the gaze, for example, on the particular region of the target device. This enables the driver to perform various types of control associated with the particular region of the target device via the first input device 2.

Figure 14:
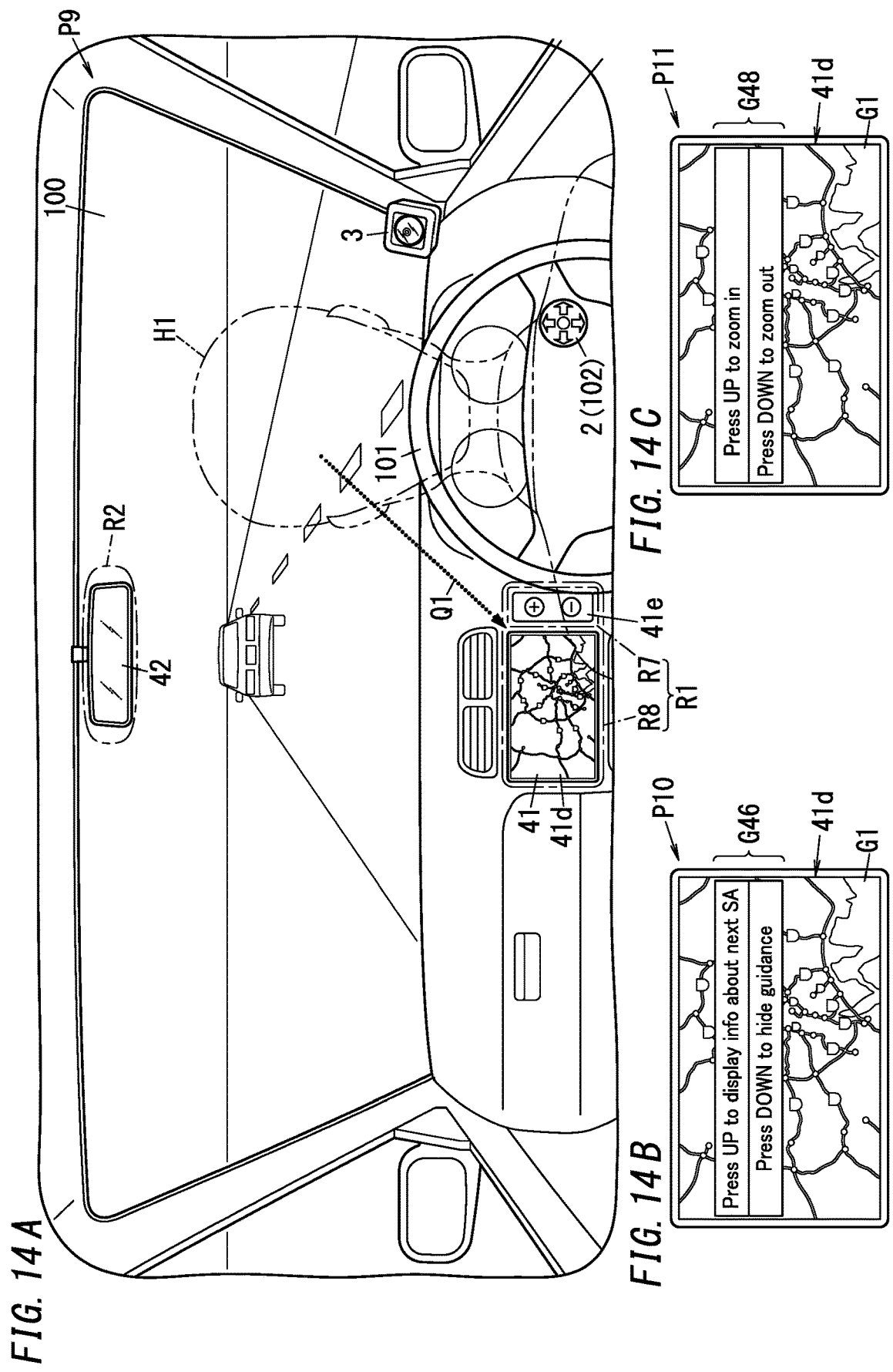
FIGS. 14A-14C illustrate how the device control system operates.

In the following description, the navigation device 41 is supposed to be determined to be the target device as an example. As shown in FIG. 14A, the navigation device 41 includes an operating unit 41e. The operating unit 41e allows the driver to enter a command of zooming in or out of the map image (navigation image) G1 displayed on the display unit 41d. Note that a region R1 is associated with the range of the navigation device 41. The region R1 is made up of particular regions R7, R8. The particular region R7 is a range where the operating unit 41e is provided and the particular region R8 is the rest of the region R1 other than the particular region R7. In the following description, the particular regions R7, R8 will be hereinafter simply referred to as "regions R7, R8."

Now, it will be described in detail how the device control system 1 according to the ninth embodiment operates in such a situation.

Figure 13:
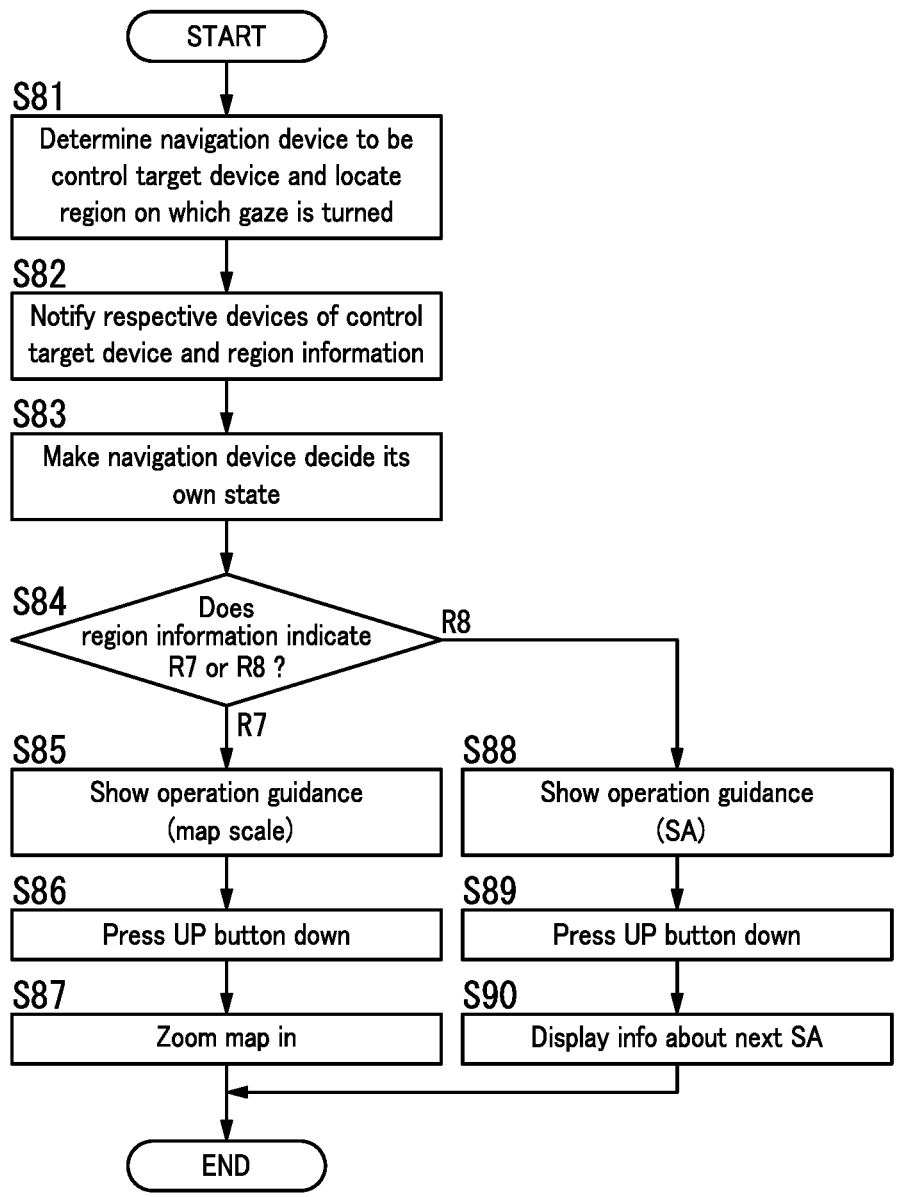
FIG. 13 is a flowchart showing the procedure of operation of a device control system according to a ninth embodiment.

As shown in FIG. 13, the (gaze decision unit 32 of the) gaze detector 3 decides that the driver should be turning his or her gaze Q1 on the navigation device 41 and determines the navigation device 41 to be the target device (in Step S81). In that case, the gaze detector 3 locates an exact part of the region R1 (which is either the region R7 or the region R8) on which the driver H1 is turning his or her gaze Q1. Then, the (gaze decision unit 32 of the) gaze detector 3 transmits a notice of determination and region information to all of the multiple devices 4 (in S82). The notice of determination is a notice indicating that the navigation device 41 has been determined to be the target device. The region information is information about the region located (which is either the region R7 or the region R8). When receiving the notice of determination, the navigation device 41 serves as the target device.

Then, on receiving the notice of determination and the region information, the (device state decision unit 41b of the) navigation device 41 decides the state of the navigation device 41 based on the notice of determination and the region information (in S83). At this time, the (device state decision unit 41b of the) navigation device 41 locates, based on the region information, the region (which is either the region R7 or the region R8) on which the driver H1 is turning his or her gaze Q1. In Step S83, the navigation device 41 may decide that the navigation device 41 should be in the map display state and the driver H1 should be turning his or her gaze Q1 on the region R7, for example. That is to say, the navigation device 41 decides the state of the navigation device 41 with the driver's gaze Q1 taken into account as well. Note that in the map display state, the map image G1 is displayed on the display unit 41d of the navigation device 41.

If the region located by the region information that the (device state decision unit 41b of the) navigation device 41 has received turns out to be the region R7 (i.e., if the driver is turning his or her gaze Q1 on the region R7 (i.e., the operating unit 41e)) (if the answer to S84 is R7), the (device state decision unit 41b of the) navigation device 41 shows the operation guidance G48 for zooming in or out of the map image G1 on the display unit 41d as in the displayed image P11 shown in FIG. 14C (in S85). Then, if the UP button is pressed down on the first input device 2 (in S86), the (function performing unit 41a of the) navigation device 41 performs, as the processing corresponding to the state of the navigation device 41, the processing of zooming in the map image G1 displayed on the display unit 41d (in S87). That is to say, the type of operation to be performed on the operating unit 41e, on which the driver H1 is turning his or her gaze Q1, may be performed by operating the first input device 2. Note that the operation guidance G48 provides information about the types of commands to be entered through the first input device 2.

On the other hand, if the region located by the region information that the (device state decision unit 41b of the) navigation device 41 has received turns out to be the region R8 (i.e., if the driver is turning his or her gaze Q1 on the region R8 (i.e., range other than the operating unit 41e)) (if the answer to S84 is R8), the (device state decision unit 41b of the) navigation device 41 shows the operation guidance G46 providing service area information on the display unit 41d as in the displayed image P10 shown in FIG. 14B (in S88). Then, when the UP button is pressed down on the first input device 2 (in S89), the (function performing unit 41a of the) navigation device 41 performs, as the processing corresponding to the state of the navigation device 41, the processing of displaying information about the next service area on the display unit 41d (in S90). Note that the operation guidance G46 provides information about the types of commands to be entered through the first input device 2.

In this embodiment, the (gaze decision unit 32 of the) gaze detector 3 transmits the notice of determination and the region information to the navigation device 41 (in S82), thereby changing, if the driver H1 turns his or her gaze Q1 on the particular region R7 of the navigation device 41, the type of processing to be performed in accordance with the command entered through the first input device 2 from the default processing (such as changing the musical tunes to play) into processing associated with the particular region R7 (such as zooming in or out of the image). In addition, the (gaze decision unit 32 of the) gaze detector 3 makes the navigation device 41 change, if the driver H1 turns his or her gaze Q1 on the particular region R8 of the navigation device 41, the type of processing to be performed in accordance with the command entered through the first input device 2 from the default processing (such as changing the musical tunes to play) into processing associated with the particular region R8 (such as providing service area information).

Tenth Embodiment

Figure 15:
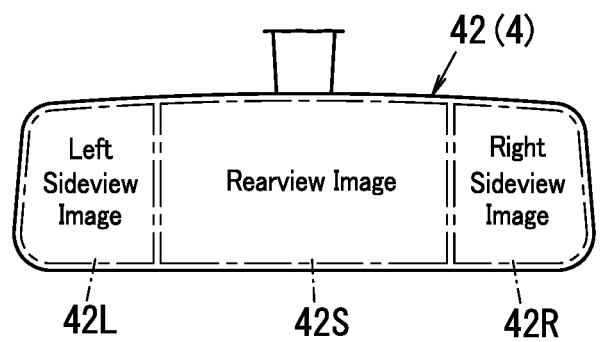
FIG. 15 is a front view of an electronic mirror.

In the ninth embodiment, particular regions are defined on the navigation device 41. In a tenth embodiment, particular regions are defined on the electronic mirror 42. As shown in FIG. 15, the display screen of the electronic mirror 42 according to this embodiment has three regions, namely, a left region 42L, a right region 42R, and an intermediate region 42S. The intermediate region 42S is a region between the left region 42L and the right region 42R. In this example, the left region 42L, right region 42R, and intermediate region 42S of the electronic mirror 42 are defined to be particular regions. In the following description, the left region 42L, right region 42R, and intermediate region 42S will be hereinafter simply referred to as regions 42R, 42L, 42S, respectively.

Figure 16:
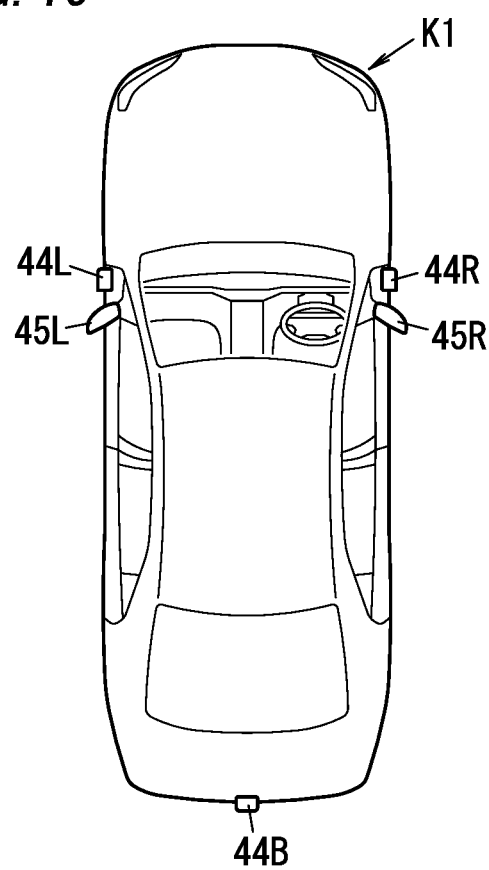
FIG. 16 is a top plan view of a vehicle in which the device control system is installed.

As shown in FIG. 16, the multiple devices 4 (see FIG. 3) include a left view camera 44L, a right view camera 44R, and a rearview camera 44B. The left view camera 44L is arranged in the vicinity of the left sideview mirror 45L of the vehicle K1 to capture, as a movie, for example, the surroundings on the left of the vehicle K1. The right view camera 44R is arranged in the vicinity of the right sideview mirror 45R of the vehicle K1 to capture, as a movie, for example, the surroundings on the right of the vehicle K1. The rearview camera 44B is arranged at the rear end of the vehicle K1 to capture, as a movie, for example, the surroundings on the rear of the vehicle K1. These cameras 44L, 44R, 44B are mounted on the vehicle K1 such that their image capturing direction is changeable under the control of the electronic mirror 42.

The image captured by the left view camera 44L (left sideview image) is displayed on the left region 42L of the electronic mirror 42 (see FIG. 15). The image captured by the right view camera 44R (right sideview image) is displayed on the right region 42R of the electronic mirror 42 (see FIG. 15). The image captured by the rearview camera 44B (rearview image) is displayed on the intermediate region 42S of the electronic mirror 42 (see FIG. 15).

Next, it will be described with reference to FIG. 17 how the device control system 1 according to the tenth embodiment operates when these particular regions are defined on the electronic mirror 42.

Figure 17:
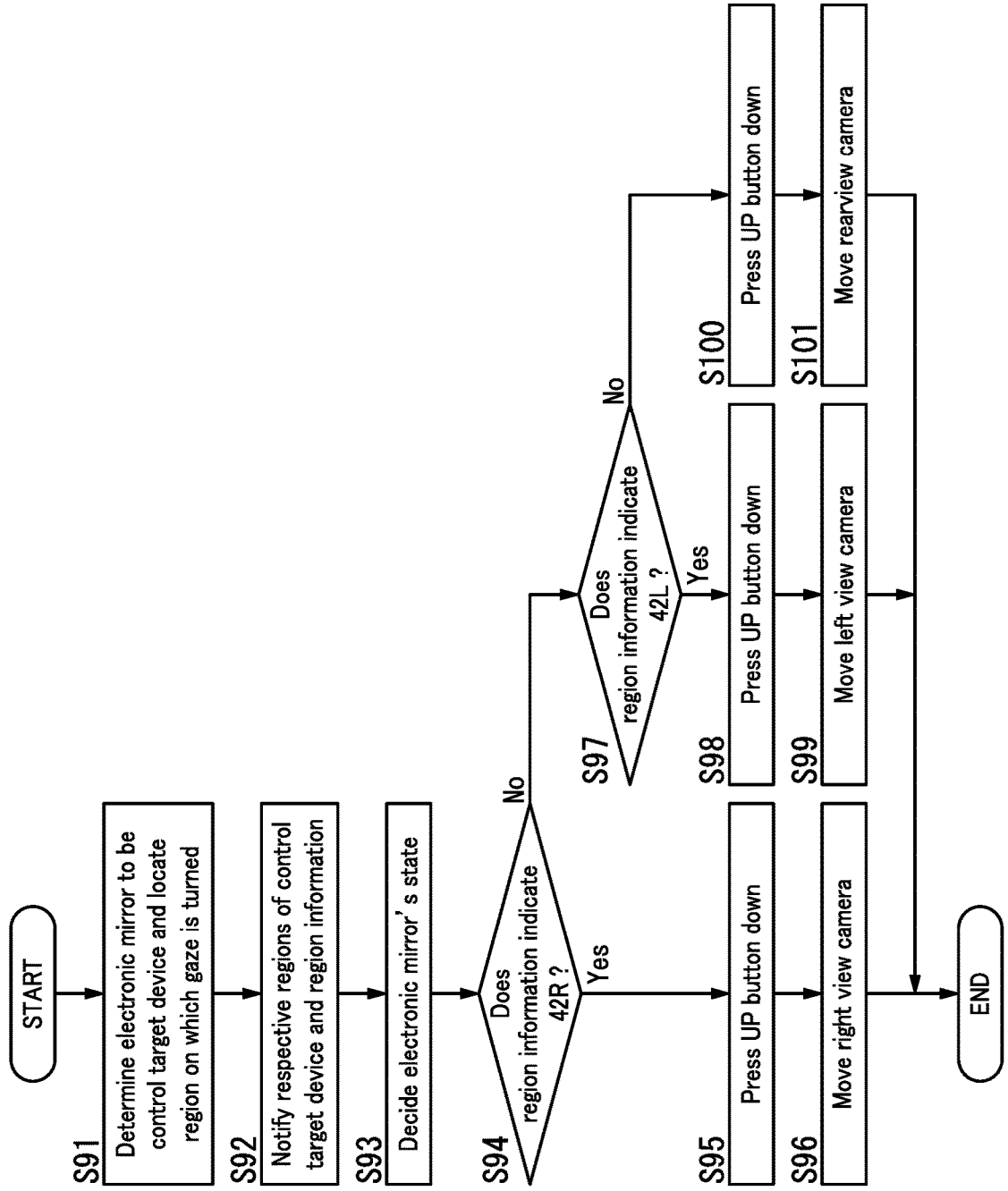
FIG. 17 is a flowchart showing the procedure of operation of the device control system.

As shown in FIG. 17, the (device state decision unit 41b of the) gaze detector 3 decides that the driver H1 should be turning his or her gaze Q1 on the electronic mirror 42, thus determining the electronic mirror 42 to be the target device (in S91). At this time, the gaze detector 3 locates the exact region (which may be the region 42L, the region 42R, or the region 42S) that the driver H1 is turning his or her gaze Q1 on (in S91). Then, the (gaze decision unit 32 of the) gaze detector 3 transmits a notice of determination and region information to all of the multiple devices 4 (in S92). The notice of determination is a notice indicating that the electronic mirror 42 has been determined to be the target device. The region information is information about the region thus located (which is the left region 42L, the right region 42R, or the intermediate region 42S). Note that the electronic mirror 42 serves as the target device by receiving the notice of determination.

On receiving the notice of determination and region information, the (device state decision unit 42*b* of the) electronic mirror 42 decides the state of the electronic mirror 42 based on the notice of determination and the region information (in S93). At this time, the (device state decision unit 42*b* of the) electronic mirror 42 locates, based on the region information, the region on which the driver H1 is turning his or her gaze Q1 (which is the region 42R, the region 42L, or the region 42S). In Step S93, the electronic mirror 42 may decide that the driver H1 should be turning his or her gaze Q1 on the region 42L of the electronic mirror 42, for example. That is to say, the electronic mirror 42 decides its own state with the driver's gaze Q1 taken into account.

Then, if the region located based on the region information received by the (device state decision unit 32*b* of the) electronic mirror 42 turns out to be the region 42R (i.e., if the driver is turning his or her gaze Q1 on the right region 42R of the electronic mirror 42) (if the answer is YES in S94), then the process proceeds to Step S95. If the UP button is pressed down in Step S95 on the first input device 2, the (function performing unit 42*a* of the) electronic mirror 42 performs, as the processing corresponding to the state of the electronic mirror 42, the processing of changing the image capturing direction of the right view camera 44R (in S96). Then, the process ends.

On the other hand, if the region located based on the region information received by the (device state decision unit 42*b* of the) electronic mirror 42 does not turn out in Step S94 to be the region 42R (if the answer is NO in S94), then the process proceeds to Step S97. If the region located based on the region information received by the (device state decision unit 42*b* of the) electronic mirror 42 turns out in Step S97 to be the region 42L (i.e., if the driver is turning his or her gaze Q1 on the left region 42L of the electronic mirror 42) (if the answer is YES in S97), then the process proceeds to Step S98. If the UP button is pressed down in Step S98 on the first input device 2, the (function performing unit 42*a* of the) electronic mirror 42 performs, as the processing corresponding to the state of the electronic mirror 42, the processing of changing the image capturing direction of the left view camera 44L (in S99). Then, the process ends.

Meanwhile, if the region located based on the region information received by the electronic mirror 42 does not turn out in Step S97 to be the region 42L (if the answer is NO in S97), then the region located based on the region information received by the electronic mirror 42 is the region 42S (i.e., the driver is turning his or her gaze Q1 on the intermediate region 42S of the electronic mirror 42). In that case, the process proceeds to Step S100. If the UP button is pressed down in Step S100 on the first input device 2, the (function performing unit 42*a* of the) electronic mirror 42 performs, as the processing corresponding to the state of the electronic mirror 42, the processing of changing the image capturing direction of the rearview camera 44B (in S101). Then, the process ends.

In this embodiment, the (gaze decision unit 32 of the) gaze detector 3 transmits the notice of determination and the region information to the electronic mirror 42 (in S92), thereby changing, if the driver H1 turns his or her gaze Q1 on the region 42R of the electronic mirror 42, the type of the processing to be performed in accordance with the command entered through the first input device 2 from the default processing (such as changing musical tunes to play) into the processing associated with the region 42R (such as the processing of moving the right view camera 44R). Also, the (gaze decision unit 32 of the) gaze detector 3 changes, if the driver H1 turns his or her gaze Q1 on the region 42L of the electronic mirror 42, the type of the processing to be performed in accordance with the command entered through the first input device 2 from the default processing (such as changing musical tunes to play) into the processing associated with the region 42L (such as the processing of moving the left view camera 44L). Furthermore, the (gaze decision unit 32 of the) gaze detector 3 changes, if the driver H1 turns his or her gaze Q1 on the region 42S of the electronic mirror 42, the type of the processing to be performed in accordance with the command entered through the first input device 2 from the default processing (such as changing musical tunes to play) into the processing associated with the region 42S (such as the processing of moving the rearview camera 44B).

(Variations)

Note that the embodiments described above are only exemplary ones of various embodiments of the present disclosure and should not be construed as limiting. Rather, the embodiments described above may be readily modified in various manners depending on a design choice or any other factor without departing from the scope of the present disclosure. Furthermore, not all aspects of the present disclosure, including the embodiments described above, have to be implemented as a single device control system 1. Alternatively, those aspects of the present disclosure, including the embodiments described above, may also be implemented as a moving vehicle including the device control system 1, a device control method, a program designed to cause at least one processor to perform the device control method, or a non-transitory storage medium that stores such a program. Optionally, the variations to be described below may be adopted in combination as appropriate.

The moving vehicle includes the device control system 1 and a moving vehicle body of a moving vehicle.

The device control method includes input processing, detection processing, and determination processing. The input processing includes entering a command with respect to a target device, which is any one of one or more devices 4. The detection processing includes detecting a user's gaze direction or facial orientation. The determination processing includes determining, based on the gaze direction or facial orientation detected in the detection processing, one device, selected from the one or more devices 4, to be the target device. The determination processing includes making the target device change, based on the gaze direction or facial orientation detected in the detection processing, a type of processing to be performed in accordance with the command entered in the input processing.

Although the target device is determined based on the user's gaze direction Q1 in the embodiments described above, the target device may also be determined based on the user's facial orientation. Alternatively, the target device may also be determined based on both the gaze direction and the facial orientation.

Also, in the embodiments described above, the first input device 2 is supposed to be the steering switch 102. However, the first input device 2 does not have to be the steering switch 102 but may also be a switch that any of the multiple devices 4 includes.

(Resume)

A device control system (1) according to a first aspect includes an input device (2), a detection device (3), and a determination device (3). The input device (2) allows a command to be entered with respect to a target device, which is any one of one or more devices (4). The detection device (3) detects a user's (H1) gaze direction (Q1) or facial orientation. The determination device (3) determines, based on the gaze direction (Q1) or facial orientation detected by the detection device (3), one device, selected from the one or more devices (4), to be the target device. The determination device (3) makes the target device change, based on the gaze direction (Q1) or facial orientation detected by the detection device (3), a type of processing to be performed in accordance with the command entered through the input device (2).

According to this configuration, the target device changes, based on the gaze direction (Q1) or facial orientation, the type of processing to be performed in accordance with the command entered through the input device (2). Changing the type of the processing according to the gaze direction (Q1) in this manner may reduce the number of times commands are entered through the input device (2). This improves the controllability of the target device via the input device (2).

In a device control system (1) according to a second aspect, which may be implemented in conjunction with the first aspect, the determination device (3) determines a device (4), which is selected from the one or more devices (4) and toward which the gaze direction (Q1) or facial orientation detected by the detection device (3) points, to be the target device.

This configuration allows the target device to be determined by simple operation such as shifting the gaze (Q1), for example.

In a device control system (1) according to a third aspect, which may be implemented in conjunction with the second aspect, the determination device (3) determines a device (4), which is selected from the one or more devices (4) and on which the gaze direction (Q1) or facial orientation detected by the detection device has been fixed for a certain period of time, to be the target device.

This configuration reduces the chances of a device (4), on which the driver (H1) happens to turn his or her gaze (Q1) just accidentally, for example, being determined to be the target device against his or her will.

In a device control system (1) according to a fourth aspect, which may be implemented in conjunction with any one of the first to third aspects, the determination device (3) makes the target device change, according to a state of the target device when the one device (4) is selected as the target device, a type of processing to be performed in accordance with the command entered through the input device (2).

This configuration allows the user to perform, on the input device (2), an appropriate type of operation according to the state of the target device. This enables the user to operate the input device (2) simply and intuitively.

In a device control system (1) according to a fifth aspect, which may be implemented in conjunction with any one of the first to fourth aspects, when the gaze direction (Q1) or facial orientation detected by the detection device (3) points toward none of the one or more devices (4), the determination device (3) determines a predetermined device to be the target device. The predetermined device is selected in advance from the one or more devices (4).

This configuration may avoid, when the gaze direction (Q1) or facial orientation points toward none of the devices (4), a situation where there are no devices (4) be controlled by the input device (2).

In a device control system (1) according to a sixth aspect, which may be implemented in conjunction with any one of the first to fifth aspects, when the input device (2) is called a first input device (2), the device control system (1) further includes a second input device (5). The second input device (5) allows a remove command to be entered. The remove command instructs that the target device should be removed from a list of devices to be controlled by the input device (2). When the remove command is entered through the second input device (5), the second input device (5) has the target device removed from the list of devices to be controlled by the input device (2).

This configuration allows the target device to be removed from the list of devices to be controlled without depending on the gaze direction (Q1) or the facial orientation.

In a device control system (1) according to a seventh aspect, which may be implemented in conjunction with any one of the first to sixth aspects, the one or more devices (4) include a display device (41). When determining the target device, the determination device (3) makes the display device (41) display operation guidance information thereon. The operation guidance information represents correspondence between a command to be entered through the input device (2) and a type of processing allocated to the command and designed to be performed by the target device.

This configuration allows the user to easily understand the type of control to be performed in accordance with the command entered through the input device (2).

In a device control system (1) according to an eighth aspect, which may be implemented in conjunction with the seventh aspect, when the target device is removed from the list of devices to be controlled by the input device (2), the determination device (3) makes the display device (41) stop displaying the operation guidance information thereon.

This configuration reduces the chances of unnecessary operation guidance information being displayed continuously on the display device (41).

In a device control system (1) according to a ninth aspect, which may be implemented in conjunction with any one of the first to eighth aspects, when the gaze direction (Q1) or facial orientation detected by the detection device (3) has been away from the target device for a certain period of time, the determination device (3) has the target device removed from the list of devices to be controlled by the input device (2).

This configuration reduces the chances of a device (4) being unintentionally removed from the list of devices to be controlled when a gaze direction (Q1) happens to be away from the device (4) just accidentally.

In a device control system (1) according to a tenth aspect, which may be implemented in conjunction with any one of the first to ninth aspects, when the gaze direction (Q1) detected by the detection device (3) points toward a particular region of the target device, the determination device (3) makes the target device change the type of processing to be performed in accordance with the command entered through the input device (2) into a type of processing associated with the particular region.

This configuration allows the type of control performed on the target device via the input device (2) to be changed just by turning the gaze (Q1), for example, on a particular region (R7, R8, 42L, 42R, 42S) of the target device. This allows the user to perform various types of control associated with the particular region (R7, R8, 42L, 42R, 42S) of the target device.

In a device control system (1) according to an eleventh aspect, which may be implemented in conjunction with any one of the first to tenth aspects, each of the one or more devices (4) is device mounted on a moving vehicle body of a moving vehicle (K1).

This configuration makes the present disclosure applicable to a device mounted on the moving vehicle body.

A moving vehicle according to a twelfth aspect includes: the device control system (1) according to the eleventh aspect; and the moving vehicle body according to the eleventh aspect.

This configuration provides a moving vehicle that achieves the advantages of the device control system (1) described above.

A device control method according to a thirteenth aspect includes input processing, detection processing, and determination processing. The input processing includes accepting a command with respect to a target device, which is any one of one or more devices (4). The detection processing includes detecting a user's (H1) gaze direction (Q1) or facial orientation. The determination processing includes determining, based on the gaze direction (Q1) or facial orientation detected in the detection processing, one device, selected from the one or more devices, to be the target device (4). The determination processing includes making the target device change, based on the gaze direction (Q1) or facial orientation detected in the detection processing, a type of processing to be performed in accordance with the command entered in the input processing.

According to this configuration, the target device changes, based on the gaze direction (Q1) or facial orientation, the type of processing to be performed in accordance with the command entered in the input processing. Changing the type of the processing according to the gaze direction (Q1) in this manner may reduce the number of times commands are entered through the input device (2). This improves the controllability of the target device via the input device (2).

A program according to a fourteenth aspect is designed to cause at least one processor to perform the device (4) control method according to the thirteenth aspect.

This configuration provides a program that causes at least one processor to perform the device control method.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A device control system, comprising:
   a switch configured to allow a command to be entered with respect to a target device, the target device being any one device of one or more devices;
   a camera configured to detect a gaze direction or a facial orientation of a user;
   a processor configured to determine, based on the gaze direction or the facial orientation detected by the camera, the one device, selected from the one or more devices, to be the target device; and
   a display,
   wherein the processor is configured to make the target device change, based on the gaze direction or the facial orientation detected by the camera, a type of processing to be performed being accordance with the command entered via the switch,
   the processor is further configured to make the target device change, according to a state of the target device as displayed on the display when the one device is selected as the target device,
   the processor is configured to, when the gaze direction detected by the camera points toward a particular region of the target device, make the target device change the type of processing to be performed in accordance with the command entered via the switch into a type of processing associated with the particular region,
   the target device is a navigation device including an input, the input being configured to zoom in or out of a map image displayed on the display,
   the particular region includes: a first particular region which is a first range where the input is provided; and a second particular region which is a second range, other than the first particular region, of the target device,
   when the gaze direction detected by the camera is on the first particular region, the target device performs, as processing corresponding to a state of the target device, processing of zooming in or out of the map image displayed on the display in accordance with the command entered via the switch, and
   when the gaze direction detected by the camera is turned on the second particular region, the target device performs, as the processing corresponding to the state of the target device, processing of displaying information about a next service area on the display in accordance with the command entered via the switch.

2. The device control system of claim 1, wherein the processor is configured to determine a device, which is selected from the one or more devices and toward which the gaze direction or the facial orientation detected by the camera points, to be the target device.

3. The device control system of claim 2, wherein the processor is configured to determine a device, which is selected from the one or more devices and toward which the gaze direction or the facial orientation detected by the camera has been fixed for a certain period of time, to be the target device.

4. The device control system of claim 1, wherein the processor is configured to, when the gaze direction or the facial orientation detected by the camera points toward none of the one or more devices, determine a predetermined device to be the target device, the predetermined device having been selected in advance from the one or more devices.

5. The device control system of claim 1, wherein when the switch is called a first input device, the device control system further includes a second input,
the second input is configured to allow a remove command to be entered, the remove command instructing that the target device be removed from a list of devices to be controlled by the switch, and
the second input is configured to, when the remove command is entered through the second input, have the target device removed from the list of devices to be controlled by the switch.

6. The device control system of claim 1, wherein
the processor is configured to, when determining the target device, make the display operation guidance information thereon, and
the operation guidance information represents correspondence between a command to be entered via the switch and the type of processing allocated to the command and designed to be performed by the target device.

7. The device control system of claim 6, wherein
the processor is configured to, when the target device is removed from the list of devices to be controlled by the switch, make the display stop displaying the operation guidance information thereon.

8. The device control system of claim 1, wherein
the processor is configured to, when the gaze direction or the facial orientation detected by the camera has been away from the target device for a certain period of time, have the target device removed from the list of devices to be controlled by the switch.

9. The device control system of claim 1, wherein
the switch is a steering switch provided for a steering wheel of a vehicle.

10. The device control system of claim 5, wherein
the second input is a predetermined operating switch provided for a steering wheel of a vehicle.

11. The device control system of claim 4, wherein
when determined to be the target device, the predetermined device performs a predetermined type of processing in accordance with the command entered via the switch, irrespective of a state of the predetermined device.

12. The device control system of claim 6, wherein
the operation guidance information is shown on the display to be superimposed on a map image.

13. The device control system of claim 6, wherein
when the camera detects that the gaze direction has turned away from either the one device determined to be the target device or all of the one or more devices, the operation guidance information automatically stops being shown.

14. A device control system, comprising:
a switch configured to allow a command to be entered with respect to a target device, the target device being any one device of one or more devices;
a camera configured to detect a gaze direction or a facial orientation of a user;
a processor configured to determine, based on the gaze direction or the facial orientation detected by the camera, the one device, selected from the one or more devices, to be the target device; and
a display,
wherein the processor is configured to make the target device change, based on the gaze direction or the facial orientation detected by the camera, a type of processing to be performed being accordance with the command entered via the switch,
the processor is further configured to make the target device change, according to a state of the target device as displayed on the display when the one device is selected as the target device,
the processor is configured to, when the gaze direction detected by the camera points toward a particular region of the target device, make the target device change the type of processing to be performed in accordance with the command entered via the switch into a type of processing associated with the particular region,
the target device is an electronic mirror arranged on an upper edge of a windshield of a vehicle,
the particular region includes: a first particular region which is a left region of a display screen of the electronic mirror; a second particular region which is a right region of the display screen of the electronic mirror; and a third particular region which is an intermediate region between the left region and the right region of the display screen of the electronic mirror,
the one or more devices include:
a left view camera configured to capture a left image representing surroundings on a left of the vehicle and display the left image on the left region of the electronic mirror,
a right view camera configured to capture a right image representing surroundings on a right of the vehicle and display the right image on the right region of the electronic mirror, and
a rear view camera configured to capture a rear image representing surroundings on the rear of the vehicle and display the rear image on the intermediate region of the electronic mirror,
when the gaze direction detected by the camera is turned on the first particular region, the target device performs, as processing corresponding to a state of the target device, processing of changing an image capturing direction of the left view camera in accordance with the command entered via the switch,
when the gaze direction detected by the camera is turned on the second particular region, the target device performs, as the processing corresponding to the state of the target device, processing of changing an image capturing direction of the right view camera in accordance with the command entered via the switch, and
when the gaze direction detected by the camera is turned on the third particular region, the target device performs, as the processing corresponding to the state of the target device, processing of changing an image capturing direction of the rear view camera in accordance with the command entered via the switch.

15. The device control system of claim 1, wherein
each of the one or more devices is a device installed on a body of a vehicle.

16. A vehicle comprising:
the device control system of claim 15; and
the body.

17. A device control method, comprising:
input processing including accepting a command with respect to a target device, the target device being any one device of one or more devices;
detection processing including detecting a gaze direction or a facial orientation of a user;
determination processing including determining, based on the gaze direction or the facial orientation detected in the detection processing, the one device, selected from the one or more devices, to be the target device; and
display processing including displaying, on a display, operation guidance information of the target device,
wherein the determination processing further includes making the target device change, based on the gaze direction or the facial orientation detected in the detection processing, a type of processing to be performed being accordance with the command accepted in the input processing,
the determination processing further includes making the target device change, according to a state of the target device as displayed on the display when the one device is selected as the target device, the determination processing further includes, when the gaze direction detected by the camera points toward a particular region of the target device, making the target device change the type of processing to be performed in accordance with the command accepted in the input processing into a type of processing associated with the particular region, the target device is a navigation device including an input, the input being configured to zoom in or out of a map image displayed on the display, the particular region includes: a first particular region which is a first range where the input is provided; and a second particular region which is a second range, other than the first particular region, of the target device, when the gaze direction determined in the determination processing is on the first particular region, the target device performs, as processing corresponding to a state of the target device, processing of zooming in or out of the map image displayed on the display in accordance with the command entered via the switch, and when the gaze direction determined in the determination processing is turned on the second particular region, the target device performs, as the processing corresponding to the state of the target device, processing of displaying information about a next service area on the display in accordance with the command entered via the switch.

18. A non-transitory storage medium storing a program which is designed to cause at least one processor to perform the device control method of claim 17.

* * * * *